(12) United States Patent
Hsieh et al.

(10) Patent No.: US 12,013,515 B2
(45) Date of Patent: Jun. 18, 2024

(54) OPTICAL LENS ASSEMBLY

(71) Applicant: GENIUS ELECTRONIC OPTICAL (XIAMEN) CO., LTD., Fujian (CN)

(72) Inventors: Hung-Chien Hsieh, Fujian (CN); Huabin Liao, Fujian (CN); Lanlan Zhang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 717 days.

(21) Appl. No.: 17/115,806

(22) Filed: Dec. 9, 2020

(65) Prior Publication Data
US 2022/0091378 A1    Mar. 24, 2022

(30) Foreign Application Priority Data
Sep. 24, 2020   (CN) .......................... 202011017585.X

(51) Int. Cl.
*G02B 13/00*    (2006.01)
*G02B 9/62*    (2006.01)

(52) U.S. Cl.
CPC ........... *G02B 13/0045* (2013.01); *G02B 9/62* (2013.01)

(58) Field of Classification Search
CPC ........ G02B 9/62; G02B 9/64; G02B 13/0045; G02B 13/0015; G02B 13/16; G02B 13/18; G02B 15/146; G02B 27/0172; G02B 27/0012; G02B 27/0025; H04N 5/2254; H04N 5/222
USPC ......... 359/656–658, 708, 713, 749, 756–762
See application file for complete search history.

(56) References Cited

FOREIGN PATENT DOCUMENTS

CN    109656001 A1 *   4/2019   ............. G02B 13/00

\* cited by examiner

*Primary Examiner* — Travis S Fissel
(74) *Attorney, Agent, or Firm* — JCIPRNET

(57) ABSTRACT

An optical lens assembly is provided, including a first lens element, a second lens element, a third lens element, a fourth lens element, a fifth lens element, and a sixth lens element sequentially along an optical axis from a first side to a second side. The optical lens assembly satisfies a conditional expression of EFL/BFL≥3.800.

20 Claims, 20 Drawing Sheets

| First Embodiment ||||||||
|---|---|---|---|---|---|---|---|
| EFL=5.026 mm, HFOV=60.000°, TTL=8.444 mm, Fno=2.513, LCR=4.114 mm ||||||||
| element | surface | radius (mm) | thickness (mm) | refractive index | Abbe number | focal length (mm) | material |
| object | | infinity | infinity | | | | |
| aperture 0 | | infinity | 0.097 | | | | |
| first lens element 1 | first side surface 11 | -31.731 | 0.441 | 1.661 | 20.373 | -81.846 | plastic |
| | second side surface 12 | -75.344 | 0.119 | | | | |
| second lens element 2 | first side surface 21 | 14.936 | 0.514 | 1.661 | 20.373 | 499.987 | plastic |
| | second side surface 22 | 15.414 | 0.064 | | | | |
| third lens element 3 | first side surface 31 | -14.982 | 1.028 | 1.773 | 49.613 | 5.429 | glass |
| | second side surface 32 | -3.393 | 0.442 | | | | |
| fourth lens element 4 | first side surface 41 | -958.821 | 1.283 | 1.531 | 55.745 | 21.838 | plastic |
| | second side surface 42 | -11.546 | 0.367 | | | | |
| fifth lens element 5 | first side surface 51 | 12.074 | 0.913 | 1.545 | 55.987 | 5.134 | plastic |
| | second side surface 52 | -3.569 | 0.767 | | | | |
| sixth lens element 6 | first side surface 61 | -1.640 | 2.121 | 1.661 | 20.373 | -2.377 | plastic |
| | second side surface 62 | 95.820 | 0.385 | | | | |
| multi-light generation unit PM | reference surface 100a | infinity | | | | | |

FIG. 9

| surface | K | $a_2$ | $a_4$ | $a_6$ | $a_8$ |
|---|---|---|---|---|---|
| 11 | 0.000000E+00 | 0.000000E+00 | -2.549413E-02 | 1.114186E-02 | -1.845595E-02 |
| 12 | 0.000000E+00 | 0.000000E+00 | -8.379551E-02 | 4.597415E-02 | -5.411895E-02 |
| 21 | -2.901012E+02 | 0.000000E+00 | -9.016736E-02 | 2.044275E-02 | -4.504063E-02 |
| 22 | 0.000000E+00 | 0.000000E+00 | -3.249563E-02 | -6.870530E-03 | 5.872998E-03 |
| 41 | 0.000000E+00 | 0.000000E+00 | -6.715120E-04 | -4.845089E-03 | 1.227183E-03 |
| 42 | 0.000000E+00 | 0.000000E+00 | 6.155250E-04 | -1.328181E-02 | 4.063429E-03 |
| 51 | 0.000000E+00 | 0.000000E+00 | 9.793552E-03 | -1.075619E-02 | 1.795416E-03 |
| 52 | 0.000000E+00 | 0.000000E+00 | 1.752483E-02 | -4.090843E-03 | -3.226880E-04 |
| 61 | -1.931886E+00 | 0.000000E+00 | 2.884912E-03 | -2.914463E-03 | 5.364670E-04 |
| 62 | 5.168700E+02 | 0.000000E+00 | 4.222560E-04 | 4.905850E-04 | -6.853500E-05 |
| surface | $a_{10}$ | $a_{12}$ | $a_{14}$ | $a_{16}$ | $a_{18}$ |
| 11 | 1.512332E-02 | -5.796573E-03 | 0.000000E+00 | 0.000000E+00 | |
| 12 | 4.048841E-02 | -1.498236E-02 | 0.000000E+00 | 0.000000E+00 | |
| 21 | 7.202174E-02 | -7.850114E-02 | 4.729959E-02 | -1.303097E-02 | |
| 22 | -2.374516E-03 | 4.576010E-04 | -7.028651E-05 | 0.000000E+00 | |
| 41 | -3.787230E-04 | 4.187000E-05 | 0.000000E+00 | 0.000000E+00 | |
| 42 | -6.421830E-04 | 4.146700E-05 | 0.000000E+00 | 0.000000E+00 | |
| 51 | -5.408800E-05 | -8.046000E-06 | 4.740000E-07 | 0.000000E+00 | |
| 52 | 2.489420E-04 | -2.773100E-05 | 9.620000E-07 | 0.000000E+00 | |
| 61 | -2.440300E-05 | 7.180000E-07 | -5.300000E-08 | 0.000000E+00 | |
| 62 | 1.324000E-06 | 1.960000E-07 | -9.000000E-09 | 0.000000E+00 | |

FIG. 10

| Second Embodiment ||||||||
|---|---|---|---|---|---|---|---|
| EFL=3.897 mm, HFOV=60.000°, TTL=7.464 mm, Fno=1.949, LCR=3.111 mm ||||||||
| element | surface | radius (mm) | thickness (mm) | refractive index | Abbe number | focal length (mm) | material |
| object | | infinity | infinity | | | | |
| aperture 0 | | infinity | 0.078 | | | | |
| first lens element 1 | first side surface 11 | -250.816 | 0.228 | 1.545 | 55.987 | -52.194 | plastic |
| | second side surface 12 | 32.286 | 0.177 | | | | |
| second lens element 2 | first side surface 21 | -43.317 | 0.517 | 1.750 | 35.021 | 670.445 | glass |
| | second side surface 22 | -40.115 | 0.043 | | | | |
| third lens element 3 | first side surface 31 | -10.232 | 0.878 | 1.923 | 18.897 | 6.134 | glass |
| | second side surface 32 | -3.840 | 0.333 | | | | |
| fourth lens element 4 | first side surface 41 | 15.465 | 2.181 | 1.540 | 59.730 | 6.814 | glass |
| | second side surface 42 | -4.623 | 0.035 | | | | |
| fifth lens element 5 | first side surface 51 | -21.840 | 0.919 | 1.531 | 55.745 | 7.573 | plastic |
| | second side surface 52 | -3.464 | 0.967 | | | | |
| sixth lens element 6 | first side surface 61 | -1.650 | 0.602 | 1.545 | 55.987 | -2.674 | plastic |
| | second side surface 62 | 14.738 | 0.585 | | | | |
| multi-light generation unit PM | reference surface 100a | infinity | | | | | |

FIG. 13

| surface | K | $a_2$ | $a_4$ | $a_6$ | $a_8$ |
|---|---|---|---|---|---|
| 11 | 0.000000E+00 | 0.000000E+00 | -5.938476E-02 | 1.741854E-02 | -4.161859E-02 |
| 12 | 0.000000E+00 | 0.000000E+00 | -8.833590E-02 | 6.098129E-03 | -4.209884E-02 |
| 21 | 1.298447E+03 | 0.000000E+00 | -5.094038E-02 | -5.015647E-02 | 9.402538E-02 |
| 22 | 0.000000E+00 | 0.000000E+00 | -2.728762E-02 | -1.132887E-02 | 4.885151E-03 |
| 41 | 0.000000E+00 | 0.000000E+00 | -4.134399E-03 | -4.952950E-03 | 7.117750E-04 |
| 42 | 0.000000E+00 | 0.000000E+00 | -4.700180E-03 | -5.326347E-03 | 2.162696E-03 |
| 51 | 0.000000E+00 | 0.000000E+00 | -1.063580E-02 | -3.943079E-03 | 2.851871E-03 |
| 52 | 0.000000E+00 | 0.000000E+00 | -6.521481E-03 | 3.328748E-03 | -7.111380E-04 |
| 61 | -1.906851E+00 | 0.000000E+00 | 7.295422E-03 | -5.299930E-03 | 9.859130E-04 |
| 62 | -5.514814E+00 | 0.000000E+00 | 1.798858E-02 | -7.135097E-03 | 1.371280E-03 |
| surface | $a_{10}$ | $a_{12}$ | $a_{14}$ | $a_{16}$ | $a_{18}$ |
| 11 | 4.136018E-02 | -1.810446E-02 | 0.000000E+00 | 0.000000E+00 | |
| 12 | 4.921273E-02 | -2.063185E-02 | 0.000000E+00 | 0.000000E+00 | |
| 21 | -1.485739E-01 | 1.397254E-01 | -6.501290E-02 | 1.130359E-02 | |
| 22 | 6.312802E-04 | -6.070481E-04 | 5.598697E-05 | 0.000000E+00 | |
| 41 | -1.142370E-04 | 1.502500E-05 | 0.000000E+00 | 0.000000E+00 | |
| 42 | -3.537210E-04 | 1.978100E-05 | 0.000000E+00 | 0.000000E+00 | |
| 51 | -5.448440E-04 | 4.711500E-05 | -1.644000E-06 | 0.000000E+00 | |
| 52 | 1.445780E-04 | -1.185100E-05 | 3.010000E-07 | 0.000000E+00 | |
| 61 | -3.951000E-05 | -1.608000E-06 | 9.700000E-08 | 0.000000E+00 | |
| 62 | -1.524340E-04 | 9.022000E-06 | -2.260000E-07 | 0.000000E+00 | |

FIG. 14

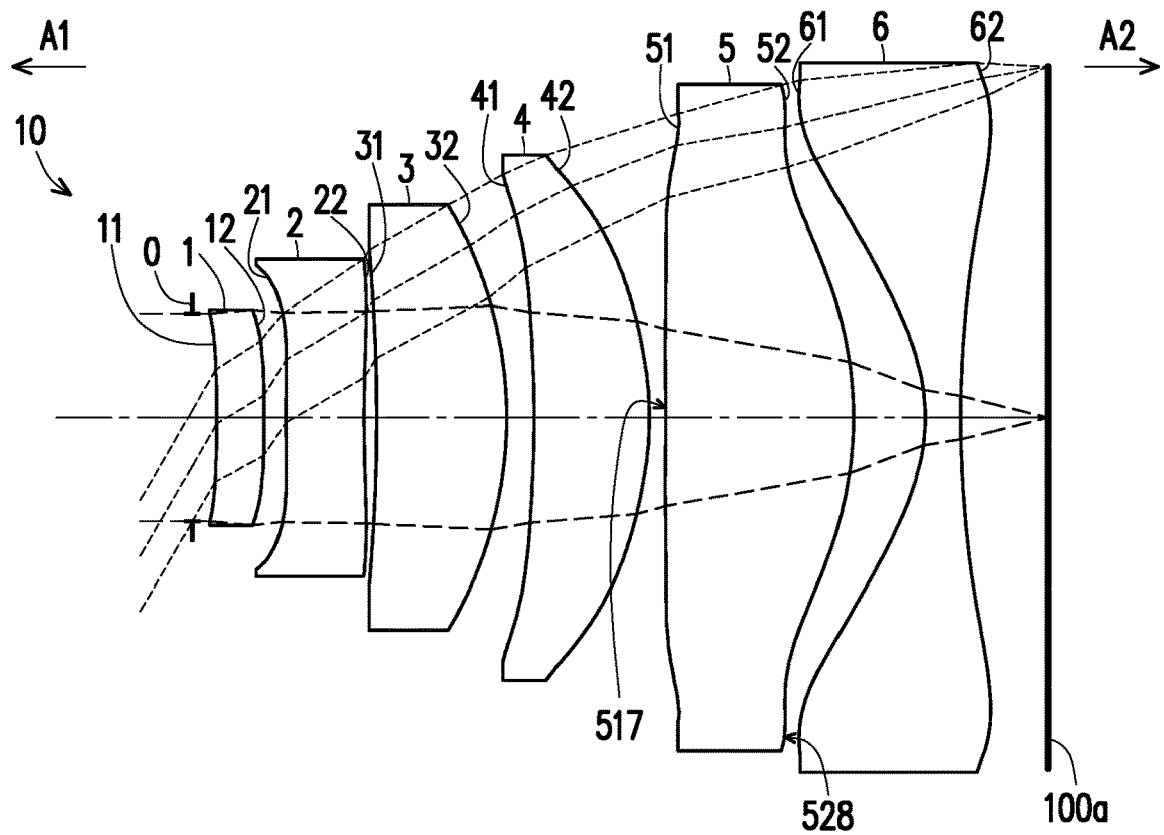
FIG. 15
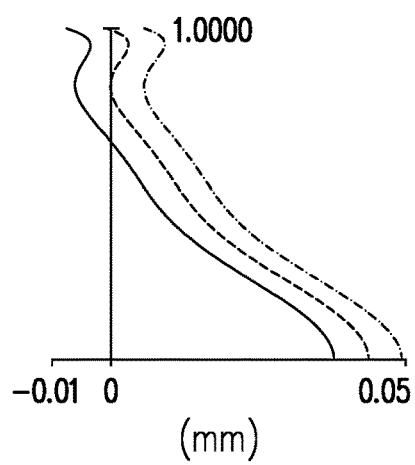
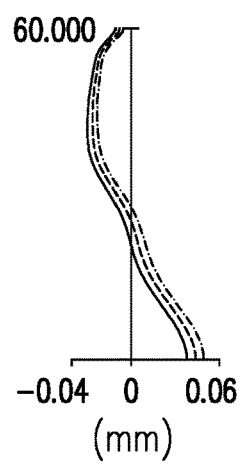
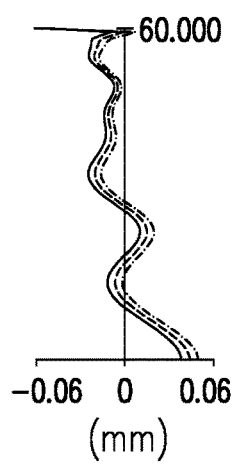
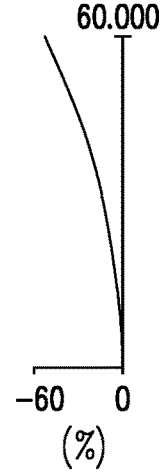
FIG. 16A   FIG. 16B   FIG. 16C   FIG. 16D

| Third Embodiment ||||||||
|---|---|---|---|---|---|---|---|
| EFL=4.181 mm, HFOV=60.000°, TTL=7.990 mm, Fno=2.090, LCR=3.380 mm ||||||||
| element | surface | radius (mm) | thickness (mm) | refractive index | Abbe number | focal length (mm) | material |
| object | | infinity | infinity | | | | |
| aperture 0 | | infinity | 0.234 | | | | |
| first lens element 1 | first side surface 11 | -18.525 | 0.457 | 1.661 | 20.373 | -3612.255 | plastic |
| | second side surface 12 | -18.853 | 0.206 | | | | |
| second lens element 2 | first side surface 21 | 13.435 | 0.751 | 1.661 | 20.373 | 140.720 | plastic |
| | second side surface 22 | 15.308 | 0.121 | | | | |
| third lens element 3 | first side surface 31 | -18.280 | 1.252 | 1.883 | 39.225 | 5.516 | glass |
| | second side surface 32 | -3.998 | 0.264 | | | | |
| fourth lens element 4 | first side surface 41 | -10.387 | 1.107 | 1.531 | 55.745 | 7.295 | plastic |
| | second side surface 42 | -2.940 | 0.155 | | | | |
| fifth lens element 5 | first side surface 51 | -23.479 | 1.807 | 1.545 | 55.987 | 7.814 | plastic |
| | second side surface 52 | -3.717 | 0.688 | | | | |
| sixth lens element 6 | first side surface 61 | -1.919 | 0.341 | 1.661 | 20.373 | -2.316 | plastic |
| | second side surface 62 | 8.817 | 0.841 | | | | |
| multi-light generation unit PM | reference surface 100a | infinity | | | | | |

FIG. 17

| surface | K | $a_2$ | $a_4$ | $a_6$ | $a_8$ |
|---|---|---|---|---|---|
| 11 | 0.000000E+00 | 0.000000E+00 | -3.403160E-02 | 1.071394E-03 | -8.139560E-04 |
| 12 | 0.000000E+00 | 0.000000E+00 | -7.839138E-02 | 1.594887E-02 | -1.531558E-02 |
| 21 | -1.547895E+01 | 0.000000E+00 | -6.123176E-02 | -1.412653E-02 | 1.460149E-02 |
| 22 | 0.000000E+00 | 0.000000E+00 | -4.627398E-03 | -1.259669E-02 | 5.785691E-03 |
| 41 | 0.000000E+00 | 0.000000E+00 | 1.364787E-02 | -4.623527E-03 | 5.661400E-05 |
| 42 | 0.000000E+00 | 0.000000E+00 | 4.953087E-02 | -2.150940E-02 | 4.993615E-03 |
| 51 | 0.000000E+00 | 0.000000E+00 | 3.718270E-02 | -2.225909E-02 | 6.306703E-03 |
| 52 | 0.000000E+00 | 0.000000E+00 | -1.040446E-03 | 1.067154E-03 | 8.591400E-05 |
| 61 | -1.958369E+00 | 0.000000E+00 | -4.401291E-03 | 8.182294E-03 | -2.611247E-03 |
| 62 | -8.999927E+01 | 0.000000E+00 | -2.135968E-03 | 4.622177E-03 | -1.373003E-03 |
| surface | $a_{10}$ | $a_{12}$ | $a_{14}$ | $a_{16}$ | $a_{18}$ |
| 11 | -4.563898E-03 | 8.339210E-04 | 0.000000E+00 | 0.000000E+00 | |
| 12 | 8.444540E-03 | -2.906432E-03 | 0.000000E+00 | 0.000000E+00 | |
| 21 | -8.827705E-03 | 2.084096E-03 | 6.574730E-04 | -4.174340E-04 | |
| 22 | -1.129455E-03 | 8.270800E-05 | -1.081000E-06 | 0.000000E+00 | |
| 41 | 7.897700E-05 | -4.544000E-06 | 0.000000E+00 | 0.000000E+00 | |
| 42 | -6.049750E-04 | 3.162900E-05 | 0.000000E+00 | 0.000000E+00 | |
| 51 | -9.019080E-04 | 6.558000E-05 | -1.981000E-06 | 0.000000E+00 | |
| 52 | 1.401400E-05 | -3.701000E-06 | 1.560000E-07 | 0.000000E+00 | |
| 61 | 3.784510E-04 | -2.521200E-05 | 6.330000E-07 | 0.000000E+00 | |
| 62 | 1.810420E-04 | -1.188900E-05 | 3.100000E-07 | 0.000000E+00 | |

FIG. 18

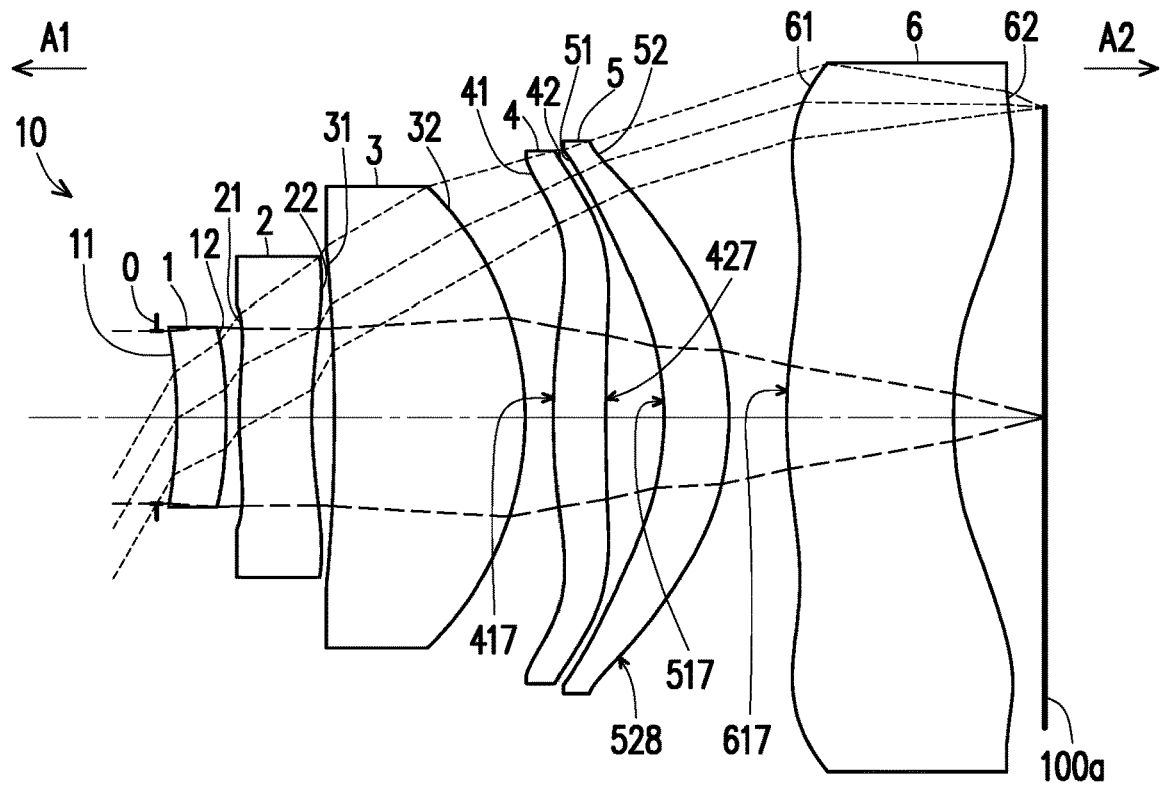
FIG. 19
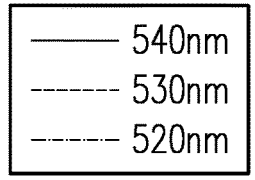
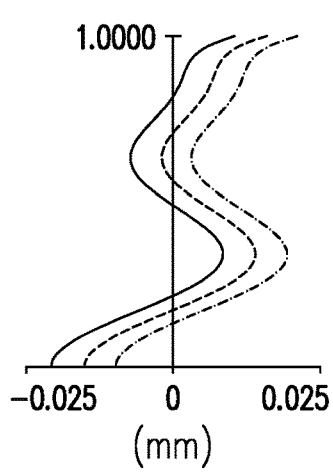
longitudinal
spherical aberration
field of view
FIG. 20A
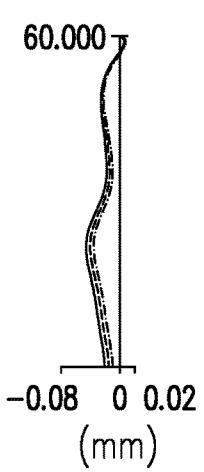
field curvature
(sagittal direction)
HFOV (°)
FIG. 20B
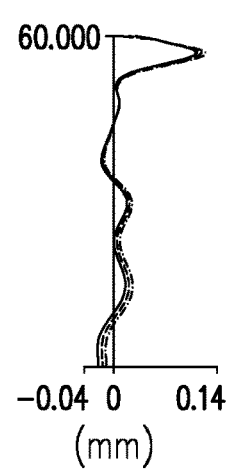
field curvature
(tangential direction)
HFOV (°)
FIG. 20C
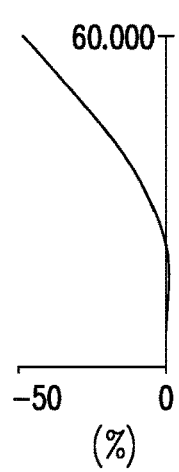
distortion
HFOV (°)
FIG. 20D

| Fourth Embodiment ||||||||
|---|---|---|---|---|---|---|---|
| EFL=4.006 mm, HFOV=60.000°, TTL=10.011 mm, Fno=2.003, LCR=3.576 mm ||||||||
| element | surface | radius (mm) | thickness (mm) | refractive index | Abbe number | focal length (mm) | material |
| object | | infinity | infinity | | | | |
| aperture 0 | | infinity | 0.234 | | | | |
| first lens element 1 | first side surface 11 | -5.307 | 0.568 | 1.661 | 20.373 | -31.211 | plastic |
| | second side surface 12 | -7.411 | 0.153 | | | | |
| second lens element 2 | first side surface 21 | 5.412 | 0.830 | 1.661 | 20.373 | 499.993 | plastic |
| | second side surface 22 | 5.161 | 0.262 | | | | |
| third lens element 3 | first side surface 31 | -20.670 | 2.205 | 1.883 | 39.225 | 4.772 | glass |
| | second side surface 32 | -3.703 | 0.326 | | | | |
| fourth lens element 4 | first side surface 41 | 9.432 | 0.601 | 1.531 | 55.745 | 20.657 | plastic |
| | second side surface 42 | 63.317 | 0.672 | | | | |
| fifth lens element 5 | first side surface 51 | -3.344 | 0.749 | 1.545 | 55.987 | -114.170 | plastic |
| | second side surface 52 | -3.813 | 0.668 | | | | |
| sixth lens element 6 | first side surface 61 | 6.210 | 1.922 | 1.661 | 20.373 | 81.954 | plastic |
| | second side surface 62 | 6.128 | 1.054 | | | | |
| multi-light generation unit PM | reference surface 100a | infinity | | | | | |

FIG. 21

| surface | K | $a_2$ | $a_4$ | $a_6$ | $a_8$ |
|---|---|---|---|---|---|
| 11 | 0.000000E+00 | 0.000000E+00 | 2.648808E-03 | 2.099004E-02 | -4.122338E-02 |
| 12 | 0.000000E+00 | 0.000000E+00 | -4.359204E-02 | 4.226736E-02 | -4.137787E-02 |
| 21 | -1.547895E+01 | 0.000000E+00 | -7.326567E-02 | 7.735777E-02 | -1.303396E-01 |
| 22 | 0.000000E+00 | 0.000000E+00 | -2.339206E-02 | 1.541438E-03 | -5.882980E-04 |
| 41 | 0.000000E+00 | 0.000000E+00 | 9.711867E-03 | -5.819879E-03 | 4.362900E-04 |
| 42 | 0.000000E+00 | 0.000000E+00 | 1.601766E-02 | -8.100764E-03 | 9.318130E-04 |
| 51 | 0.000000E+00 | 0.000000E+00 | 1.405299E-03 | 4.650570E-04 | 5.988330E-04 |
| 52 | 0.000000E+00 | 0.000000E+00 | -1.426499E-02 | 5.925550E-04 | 9.425240E-04 |
| 61 | -1.958369E+00 | 0.000000E+00 | -2.440421E-03 | -4.425269E-03 | 8.367940E-04 |
| 62 | -8.999927E+01 | 0.000000E+00 | 6.758090E-02 | -2.346544E-02 | 3.995073E-03 |
| surface | $a_{10}$ | $a_{12}$ | $a_{14}$ | $a_{16}$ | $a_{18}$ |
| 11 | 3.247874E-02 | -1.063901E-02 | 0.000000E+00 | 0.000000E+00 | |
| 12 | 2.046605E-02 | -5.212064E-03 | 0.000000E+00 | 0.000000E+00 | |
| 21 | 1.386854E-01 | -9.178842E-02 | 3.315393E-02 | -5.146986E-03 | |
| 22 | 1.735300E-04 | -3.586700E-05 | 3.384000E-06 | 0.000000E+00 | |
| 41 | -2.219000E-06 | -1.610000E-07 | 0.000000E+00 | 0.000000E+00 | |
| 42 | -4.132200E-05 | 6.000000E-07 | 0.000000E+00 | 0.000000E+00 | |
| 51 | -1.427520E-04 | 1.216100E-05 | -3.450000E-07 | 0.000000E+00 | |
| 52 | -1.934490E-04 | 1.415300E-05 | -3.320000E-07 | 0.000000E+00 | |
| 61 | -6.378000E-05 | 2.325000E-06 | -3.400000E-08 | 0.000000E+00 | |
| 62 | -3.719630E-04 | 1.773000E-05 | -3.370000E-07 | 0.000000E+00 | |

FIG. 22 longitudinal
spherical aberration
field of view field curvature
(sagittal direction)
HFOV (°)

field curvature
(tangential direction)
HFOV (°)

distortion
HFOV (°)

| Fifth Embodiment ||||||||
|---|---|---|---|---|---|---|---|
| EFL=3.696 mm, HFOV=60.000°, TTL=7.875 mm, Fno=1.848, LCR=3.521 mm ||||||||
| element | surface | radius (mm) | thickness (mm) | refractive index | Abbe number | focal length (mm) | material |
| object | | infinity | infinity | | | | |
| aperture 0 | | infinity | 0.234 | | | | |
| first lens element 1 | first side surface 11 | -17.333 | 0.396 | 1.661 | 20.373 | -32.325 | plastic |
| | second side surface 12 | -86.623 | 0.143 | | | | |
| second lens element 2 | first side surface 21 | 10.560 | 0.788 | 1.661 | 20.373 | 194.162 | plastic |
| | second side surface 22 | 11.146 | 0.116 | | | | |
| third lens element 3 | first side surface 31 | -23.116 | 1.328 | 1.883 | 39.225 | 4.474 | glass |
| | second side surface 32 | -3.492 | 0.078 | | | | |
| fourth lens element 4 | first side surface 41 | 12.585 | 1.052 | 1.531 | 55.745 | 39.112 | plastic |
| | second side surface 42 | 30.703 | 0.073 | | | | |
| fifth lens element 5 | first side surface 51 | 12.727 | 1.905 | 1.545 | 55.987 | 12.280 | plastic |
| | second side surface 52 | -13.491 | 1.230 | | | | |
| sixth lens element 6 | first side surface 61 | -1.903 | 0.308 | 1.661 | 20.373 | 499.979 | plastic |
| | second side surface 62 | -2.015 | 0.458 | | | | |
| multi-light generation unit PM | reference surface 100a | infinity | | | | | |

FIG. 25

| surface | K | $a_2$ | $a_4$ | $a_6$ | $a_8$ |
|---|---|---|---|---|---|
| 11 | 0.000000E+00 | 0.000000E+00 | -3.731279E-02 | 3.495374E-02 | -3.842740E-02 |
| 12 | 0.000000E+00 | 0.000000E+00 | -8.757922E-02 | 3.990050E-02 | -2.252737E-02 |
| 21 | -1.547895E+01 | 0.000000E+00 | -9.185976E-02 | 1.585693E-02 | 1.731817E-03 |
| 22 | 0.000000E+00 | 0.000000E+00 | -2.670889E-02 | -2.796648E-03 | 2.644065E-03 |
| 41 | 0.000000E+00 | 0.000000E+00 | 1.689792E-03 | -3.637733E-03 | -3.201300E-04 |
| 42 | 0.000000E+00 | 0.000000E+00 | 9.069754E-03 | -1.994487E-02 | 5.969659E-03 |
| 51 | 0.000000E+00 | 0.000000E+00 | 1.676534E-03 | -1.469508E-02 | 5.731836E-03 |
| 52 | 0.000000E+00 | 0.000000E+00 | -2.157517E-02 | 3.446230E-03 | -1.893570E-04 |
| 61 | -1.958369E+00 | 0.000000E+00 | -3.609351E-02 | 1.041500E-02 | -2.297852E-03 |
| 62 | -8.999927E+01 | 0.000000E+00 | -1.643789E-02 | 8.134835E-03 | -2.148822E-03 |
| surface | $a_{10}$ | $a_{12}$ | $a_{14}$ | $a_{16}$ | $a_{18}$ |
| 11 | 1.619665E-02 | -8.440950E-04 | 0.000000E+00 | 0.000000E+00 | |
| 12 | 4.150876E-03 | 1.337600E-03 | 0.000000E+00 | 0.000000E+00 | |
| 21 | -1.315413E-02 | 1.165715E-02 | -4.174348E-03 | 5.219440E-04 | |
| 22 | -4.769990E-04 | 2.089400E-05 | 2.960000E-07 | 0.000000E+00 | |
| 41 | 1.702470E-04 | -1.056800E-05 | 0.000000E+00 | 0.000000E+00 | |
| 42 | -8.245480E-04 | 4.490800E-05 | 0.000000E+00 | 0.000000E+00 | |
| 51 | -9.104500E-04 | 6.234500E-05 | -1.480000E-06 | 0.000000E+00 | |
| 52 | 1.606600E-05 | -1.852000E-06 | 6.200000E-08 | 0.000000E+00 | |
| 61 | 3.696500E-04 | -2.940100E-05 | 8.730000E-07 | 0.000000E+00 | |
| 62 | 2.763370E-04 | -1.713000E-05 | 4.170000E-07 | 0.000000E+00 | |

FIG. 26

| conditional expression | first embodiment | second embodiment | third embodiment | fourth embodiment | fifth embodiment |
|---|---|---|---|---|---|
| T1 | 0.441 | 0.228 | 0.457 | 0.568 | 0.396 |
| G12 | 0.119 | 0.177 | 0.206 | 0.153 | 0.143 |
| T2 | 0.514 | 0.517 | 0.751 | 0.830 | 0.788 |
| G23 | 0.064 | 0.043 | 0.121 | 0.262 | 0.116 |
| T3 | 1.028 | 0.878 | 1.252 | 2.205 | 1.328 |
| G34 | 0.442 | 0.333 | 0.264 | 0.326 | 0.078 |
| T4 | 1.283 | 2.181 | 1.107 | 0.601 | 1.052 |
| G45 | 0.367 | 0.035 | 0.155 | 0.672 | 0.073 |
| T5 | 0.913 | 0.919 | 1.807 | 0.749 | 1.905 |
| G56 | 0.767 | 0.967 | 0.688 | 0.668 | 1.230 |
| T6 | 2.121 | 0.602 | 0.341 | 1.922 | 0.308 |
| BFL | 0.385 | 0.585 | 0.841 | 1.054 | 0.458 |
| EFL | 5.026 | 3.897 | 4.181 | 4.006 | 3.696 |
| TL | 8.059 | 6.879 | 7.149 | 8.958 | 7.417 |
| TTL | 8.444 | 7.464 | 7.990 | 10.011 | 7.875 |
| ALT | 6.300 | 5.324 | 5.715 | 6.876 | 5.777 |
| AAG | 1.759 | 1.555 | 1.434 | 2.082 | 1.640 |
| V1 | 20.373 | 55.987 | 20.373 | 20.373 | 20.373 |
| V2 | 20.373 | 35.021 | 20.373 | 20.373 | 20.373 |
| V3 | 49.613 | 18.897 | 39.225 | 39.225 | 39.225 |
| V4 | 55.745 | 59.730 | 55.745 | 55.745 | 55.745 |
| V5 | 55.987 | 55.745 | 55.987 | 55.987 | 55.987 |
| V6 | 20.373 | 55.987 | 20.373 | 20.373 | 20.373 |

FIG. 27

| conditional expression | first embodiment | second embodiment | third embodiment | fourth embodiment | fifth embodiment |
|---|---|---|---|---|---|
| EFL/BFL | 13.061 | 6.666 | 4.971 | 3.802 | 8.075 |
| ALT/AAG | 3.581 | 3.424 | 3.986 | 3.302 | 3.524 |
| TL/BFL | 20.944 | 11.768 | 8.500 | 8.502 | 16.205 |
| EFL/(T2+T4) | 2.797 | 1.444 | 2.250 | 2.798 | 2.008 |
| TTL/(G12+G23+G34) | 13.500 | 13.500 | 13.510 | 13.505 | 23.391 |
| (T2+T3+T4)/T1 | 6.400 | 15.681 | 6.806 | 6.402 | 7.997 |
| V1+V2+V3 | 90.359 | 109.905 | 79.971 | 79.971 | 79.971 |
| ALT/(AAG+BFL) | 2.939 | 2.488 | 2.512 | 2.193 | 2.755 |
| TL/(T2+G23) | 13.955 | 12.283 | 8.202 | 8.202 | 8.203 |
| (EFL+AAG)/(T3+T5) | 3.495 | 3.035 | 1.835 | 2.061 | 1.650 |
| TTL/(T5+G56+T6) | 2.222 | 3.001 | 2.817 | 2.998 | 2.287 |
| (T5+T6)/T1 | 6.874 | 6.669 | 4.702 | 4.702 | 5.587 |
| V3+V4+V5 | 161.346 | 134.373 | 150.958 | 150.958 | 150.958 |
| ALT/(T3+T6) | 2.001 | 3.599 | 3.588 | 1.666 | 3.532 |
| (TL+EFL)/(T3+G34) | 8.899 | 8.901 | 7.474 | 5.122 | 7.904 |
| AAG/(G45+G56) | 1.552 | 1.552 | 1.702 | 1.553 | 1.258 |
| TTL/AAG | 4.800 | 4.800 | 5.572 | 4.808 | 4.803 |
| (T4+G45+T5)/(T1+G12) | 4.570 | 7.742 | 4.627 | 2.803 | 5.624 |

FIG. 28

OPTICAL LENS ASSEMBLY

CROSS-REFERENCE TO RELATED APPLICATION

This application claims the priority benefit of China application serial no. 202011017585.X, filed on Sep. 24, 2020. The entirety of the above-mentioned patent application is hereby incorporated by reference herein and made a part of this specification.

BACKGROUND

Technical Field

The disclosure relates to an optical lens assembly and particularly relates to an optical lens assembly suitable for projection.

Description of Related Art

In recent years, the applications of portable electronic products have become more and more diversified. In addition to image and video recording, the applications of miniaturized projection lenses have gradually increased as head-mounted appliances develop. The projection lens uses a light source to project an image through an optical lens assembly. However, the focal plane of the light varies with different wavelengths. In addition, different environmental temperatures may also affect the optical quality. The above-mentioned problems all impose challenges on the development of optical lens assembly.

SUMMARY

The disclosure provides an optical lens assembly, which has a small size, a large field of view, good thermal stability and enables the light with different wavelengths to pass through while maintaining good optical quality.

An embodiment of the disclosure provides an optical lens assembly, which includes a first lens element, a second lens element, a third lens element, a fourth lens element, a fifth lens element, and a sixth lens element sequentially along an optical axis from a first side to a second side. The first side is a light exit side or an object side, and the second side is a light incident side or an image side. Each of the first lens element to the sixth lens element includes a first side surface facing the first side and allowing imaging rays to pass through, and a second side surface facing the second side and allowing imaging rays to pass through. The first lens element has negative refracting power. A periphery region of the second side surface of the second lens element is convex. The third lens element has positive refracting power. A periphery region of the first side surface of the third lens element is concave. The fourth lens element has positive refracting power. Lens elements of the optical lens assembly only include the first lens element to the sixth lens element described above, and satisfy the following conditional expression: $EFL/BFL \geq 3.800$, where EFL is an effective focal length of the optical lens assembly, and BFL is a distance on the optical axis from the second side surface of the sixth lens element to a reference surface, and the reference surface is a light-emitting surface or an image plane.

An embodiment of the disclosure provides an optical lens assembly, which includes a first lens element, a second lens element, a third lens element, a fourth lens element, a fifth lens element, and a sixth lens element sequentially along an optical axis from a first side to a second side. The first side is a light exit side or an object side, and the second side is a light incident side or an image side. Each of the first lens element to the sixth lens element includes a first side surface facing the first side and allowing imaging rays to pass through, and a second side surface facing the second side and allowing imaging rays to pass through. The second lens element has positive refracting power, and a periphery region of the first side surface of the second lens element is concave. A periphery region of the second side surface of the third lens element is convex. A periphery region of the first side surface of the sixth lens element is convex. Lens elements of the optical lens assembly only include the first lens element to the sixth lens element described above, at least four of the first lens element to the sixth lens element have positive refracting power, and the optical lens assembly satisfies the following conditional expression: $EFL/BFL \geq 3.800$, where EFL is an effective focal length of the optical lens assembly, and BFL is a distance on the optical axis from the second side surface of the sixth lens element to a reference surface, and the reference surface is a light-emitting surface or an image plane.

An embodiment of the disclosure provides an optical lens assembly, which includes a first lens element, a second lens element, a third lens element, a fourth lens element, a fifth lens element, and a sixth lens element sequentially along an optical axis from a first side to a second side. The first side is a light exit side or an object side, and the second side is a light incident side or an image side. Each of the first lens element to the sixth lens element includes a first side surface facing the first side and allowing imaging rays to pass through, and a second side surface facing the second side and allowing imaging rays to pass through. The second lens element has positive refracting power, and a periphery region of the first side surface of the second lens element is concave. A periphery region of the first side surface of the sixth lens element is convex, and a periphery region of the second side surface of the sixth lens element is convex. Lens elements of the optical lens assembly only include the first lens element to the sixth lens element described above, at least four of the first lens element to the sixth lens element have positive refracting power, and the optical lens assembly satisfies the following conditional expression: $EFL/BFL \geq 3.800$, where EFL is an effective focal length of the optical lens assembly, and BFL is a distance on the optical axis from the second side surface of the sixth lens element to a reference surface, and the reference surface is a light-emitting surface or an image plane.

An embodiment of the disclosure provides an optical lens assembly, which includes a first lens element, a second lens element, a third lens element, a fourth lens element, a fifth lens element, and a sixth lens element sequentially along an optical axis from a first side to a second side. The first side is a light exit side or an object side, and the second side is a light incident side or an image side. Each of the first lens element to the sixth lens element includes a first side surface facing the first side and allowing imaging rays to pass through, and a second side surface facing the second side and allowing imaging rays to pass through. An optical axis region of the second side surface of the first lens element is concave. The second lens element has positive refracting power. A periphery region of the first side surface of the second lens element is concave. A periphery region of the second side surface of the second lens element is convex. The third lens element has positive refracting power. The fourth lens element has positive refracting power. The fifth lens element has positive refracting power. Lens elements of the optical lens assembly only include the first lens element to the sixth lens element described above.

An embodiment of the disclosure provides an optical lens assembly, which includes a first lens element, a second lens element, a third lens element, a fourth lens element, a fifth lens element, and a sixth lens element sequentially along an optical axis from a first side to a second side. The first side is a light exit side or an object side, and the second side is a light incident side or an image side. Each of the first lens element to the sixth lens element includes a first side surface facing the first side and allowing imaging rays to pass through, and a second side surface facing the second side and allowing imaging rays to pass through. The second lens element has positive refracting power. A periphery region of the first side surface of the second lens element is concave. A periphery region of the second side surface of the second lens element is convex. The third lens element has positive refracting power. A periphery region of the second side surface of the third lens element is convex. The fourth lens element has positive refracting power. The fifth lens element has positive refracting power. Lens elements of the optical lens assembly only include the first lens element to the sixth lens element described above.

An embodiment of the disclosure provides an optical lens assembly, which includes a first lens element, a second lens element, a third lens element, a fourth lens element, a fifth lens element, and a sixth lens element sequentially along an optical axis from a first side to a second side. The first side is a light exit side or an object side, and the second side is a light incident side or an image side. Each of the first lens element to the sixth lens element includes a first side surface facing the first side and allowing imaging rays to pass through, and a second side surface facing the second side and allowing imaging rays to pass through. The second lens element has positive refracting power. A periphery region of the first side surface of the second lens element is concave. A periphery region of the second side surface of the second lens element is convex. The third lens element has positive refracting power. The fourth lens element has positive refracting power. The fifth lens element has positive refracting power. A periphery region of the second side surface of the sixth lens element is convex. Lens elements of the optical lens assembly only include the first lens element to the sixth lens element described above.

Based on the above, the beneficial effects of the optical lens assembly according to the embodiments of the disclosure are: by satisfying the concave-convex curved surface arrangement design of the lens element, the condition of the refracting power, and the design of the conditional expression, the optical lens assembly has a small size, a large field of view, good thermal stability and enables the light with different wavelengths to pass through while maintaining good optical quality.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 9 shows detailed optical data of the optical lens assembly according to the first embodiment of the disclosure.

FIG. 10 shows aspheric parameters of the optical lens assembly according to the first embodiment of the disclosure.

FIG. 13 shows detailed optical data of the optical lens assembly according to the second embodiment of the disclosure.

FIG. 14 shows aspheric parameters of the optical lens assembly according to the second embodiment of the disclosure.

FIG. 15 is a schematic diagram of an optical lens assembly according to the third embodiment of the disclosure.

FIGS. 16A to 16D are diagrams of longitudinal spherical aberration and various aberrations of the optical lens assembly according to the third embodiment.

FIG. 17 shows detailed optical data of the optical lens assembly according to the third embodiment of the disclosure.

FIG. 18 shows aspheric parameters of the optical lens assembly according to the third embodiment of the disclosure.

FIG. 19 is a schematic diagram of an optical lens assembly according to the fourth embodiment of the disclosure.

FIGS. 20A to 20D are diagrams of longitudinal spherical aberration and various aberrations of the optical lens assembly according to the fourth embodiment.

FIG. 21 shows detailed optical data of the optical lens assembly according to the fourth embodiment of the disclosure.

FIG. 22 shows aspheric parameters of the optical lens assembly according to the fourth embodiment of the disclosure.

FIG. 25 shows detailed optical data of the optical lens assembly according to the fifth embodiment of the disclosure.

FIG. 26 shows aspheric parameters of the optical lens assembly according to the fifth embodiment of the disclosure.

FIGS. 27 and 28 shows values of important parameters and relational expressions thereof of the optical lens assemblies according to the first to fifth embodiments of the disclosure.

DETAILED DESCRIPTION OF DISCLOSED EMBODIMENTS

Figure 1A:
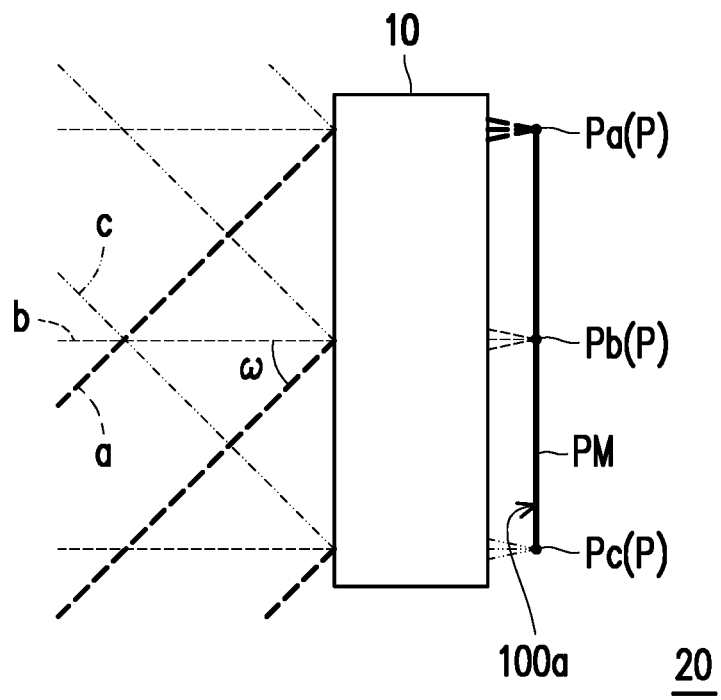
FIG. 1A is a schematic diagram illustrating an application of an optical lens assembly to a projection lens according to the disclosure.

Please refer to FIG. 1A. In an embodiment, an optical lens assembly 10 according to the embodiment of the disclosure is applicable for projection. The ray direction of a projection lens element 20 is that multiple imaging rays are emitted by a multi-light generation unit PM, multiple imaging rays a, b and c with different exit angles are generated after passing through the optical lens assembly 10 according to the embodiment of the disclosure, and the multiple imaging rays a, b and c are configured to be projected to a front environment. The range of the exit angle falls within, for example, the range of –ω degrees to ω degrees, where ω is the maximum half exit angle of the optical lens assembly 10. The form of the imaging rays a, b and c are not limited. Here, the direction of the imaging rays is described in the form of dotted lines, the number of imaging rays a, b and c is not limited to three, and the number may be other numbers that are not equal to 3 and 1. The imaging rays a, b and c are represented in FIG. 1A. The imaging rays a, b and c respectively have a chief ray Lc and a marginal ray Lm (not shown). The chief ray and the marginal ray of the imaging ray a are approximately parallel to each other. Similarly, the chief ray and the marginal ray of the imaging ray b are also approximately parallel to each other, and the chief ray and the marginal ray of the imaging ray c are also approximately parallel to each other. In detail, the imaging rays a, b and c in FIG. 1A are respectively emitted by light sources Pa, Pb and Pc at different positions in FIG. 1B. It can be known from FIG. 1A that the imaging rays emitted by a light source P at different positions all exit from the optical lens assembly 10 in parallel after passing through the optical lens assembly 10, but the exit directions are different depending on the positions. Taking FIG. 1A as an example, the light source Pa exits the optical lens assembly 10 obliquely to the lower left and parallelly (as shown by the imaging ray a) after passing through the optical lens assembly 10. The light source Pb at another position exits the optical lens assembly 10 to the front left and parallelly (as shown by the imaging ray b) after passing through the optical lens assembly 10. The light source Pc at still another position exits the optical lens assembly 10 obliquely to the upper left and parallelly (as shown by the imaging ray c) after passing through the optical lens assembly 10.

Figure 1B:
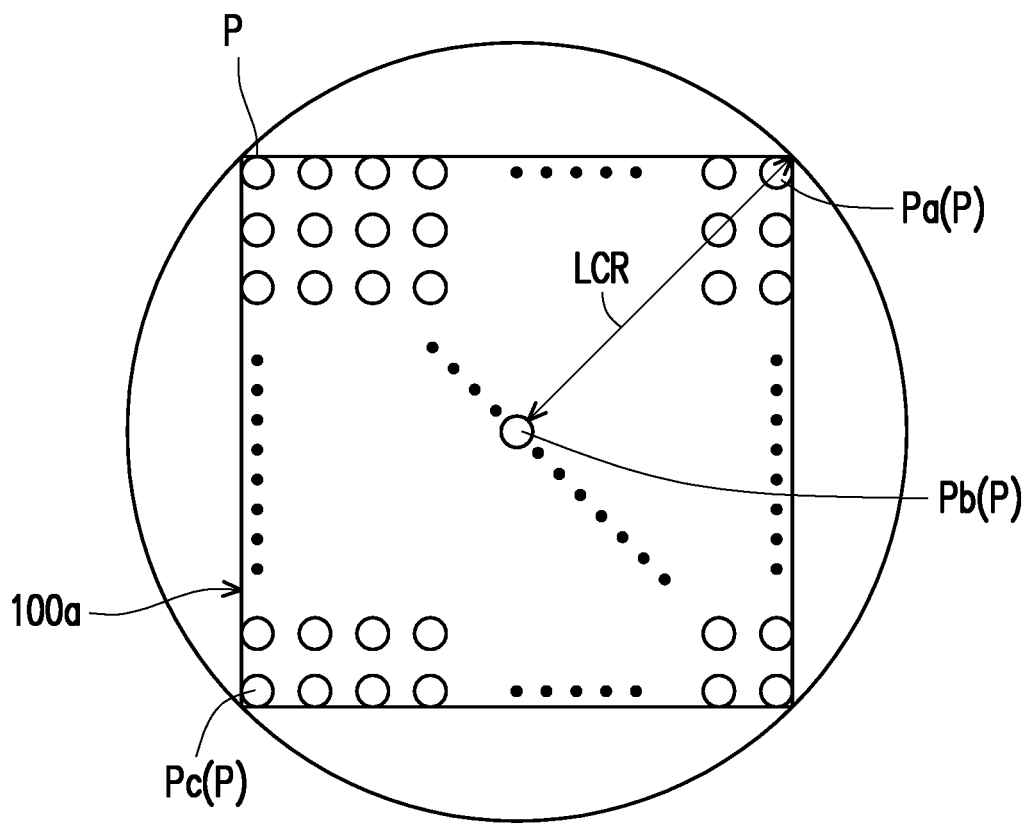
FIG. 1B is a front view of a multi-light generation unit in FIG. 1A according to an embodiment.

Please refer to FIG. 1B. In an embodiment, the multi-light generation unit PM includes multiple light sources P arranged in an array. The light source P is, for example, a near infrared light source or a green light source, but the disclosure is not limited thereto. In addition, in other implementations, the arrangement of the light sources P may also be a circular arrangement or other arrangements, but the disclosure is not limited thereto. The light source P is, for example, a laser diode, a light-emitting diode (LED), a mini LED or a micro LED. The size of the mini LED is, for example, in a range of 75 μm to 300 μm, and the size of the micro LED is, for example, in a range of less than 75 μm. The light-emitting surfaces of the light sources P form a reference surface 100a. In an embodiment, the reference surface 100a is the light-emitting surface of the multi-light generation unit PM.

It should be noted that if the optical lens assembly 10 according to the embodiment of the disclosure is configured for projection, for example, the optical lens assembly 10 is a projection lens of a projector, then the judgment criterion of the optical specifications according to the embodiment of the disclosure described below is to assume that the reverse tracking of the ray direction is a parallel imaging ray that passes through the optical lens assembly 10 from a first side to the reference surface 100a on a second side to focus and image. The reference surface 100a is the light-emitting surface of the multi-light generation unit PM. The second side is the side facing the multi-light generation unit PM (that is, the light incident side), and the first side is the opposite side (that is, the light exit side). In addition, if the optical lens assembly 10 according to the embodiment of the disclosure is configured for projection, then a second side surface of each lens element of the optical lens assembly 10 described below refers to the surface facing the multi-light generation unit PM (that is, the light incident surface), and a first side surface of each lens element of the optical lens assembly 10 described below is the opposite surface (that is, the light exit surface).

If the optical lens assembly 10 according to the embodiment of the disclosure is configured for imaging (for example, the optical lens assembly 10 is an imaging lens of a camera), then the judgment criterion of the optical specifications according to the embodiment of the disclosure described below is to assume that the tracking of the ray direction is a parallel imaging ray that passes through the optical lens assembly 10 from the first side to the reference surface 100a on the second side to focus and image. The reference surface 100a is an image plane. The second side is the side facing the image plane (that is, the image side), and the first side is the side facing the object to be shot (that is, the object side). In addition, if the optical lens assembly 10 according to the embodiment of the disclosure is configured for imaging, then the second side surface of each lens element of the optical lens assembly 10 described below refers to the surface facing the image plane (that is, the image side surface), and the first side surface of each lens element of the optical lens assembly 10 described below refers to the surface facing the object to be shot (that is, the object side surface).

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays (in the case that the optical lens assembly is an imaging lens of a camera) or the reverse tracks of the imaging rays (in the case that the optical lens assembly is a projection lens of a projector) pass through the optical system to produce an image on an image plane. The term "a lens element having positive refracting power (or negative refracting power)" means that the paraxial refracting power of the lens element in Gaussian optics is positive (or negative). The term "a first side (or a second side) surface of a lens element" refers to a specific region of that surface of the lens element at which imaging rays can pass through that specific region. Imaging rays include at least two types of rays: a chief ray Lc and a marginal ray Lm (as shown in FIG. 1). A first side (or a second side) surface of a lens element can be characterized as having several regions, including an optical axis region, a periphery region, and, in some cases, one or more intermediate regions, as discussed more fully below.

Figure 2:
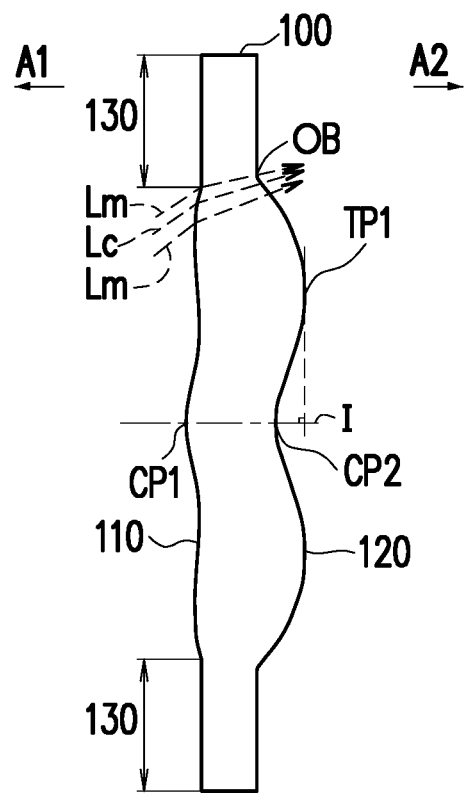
FIG. 2 is a schematic diagram illustrating a surface structure of a lens element.
Figure 5:
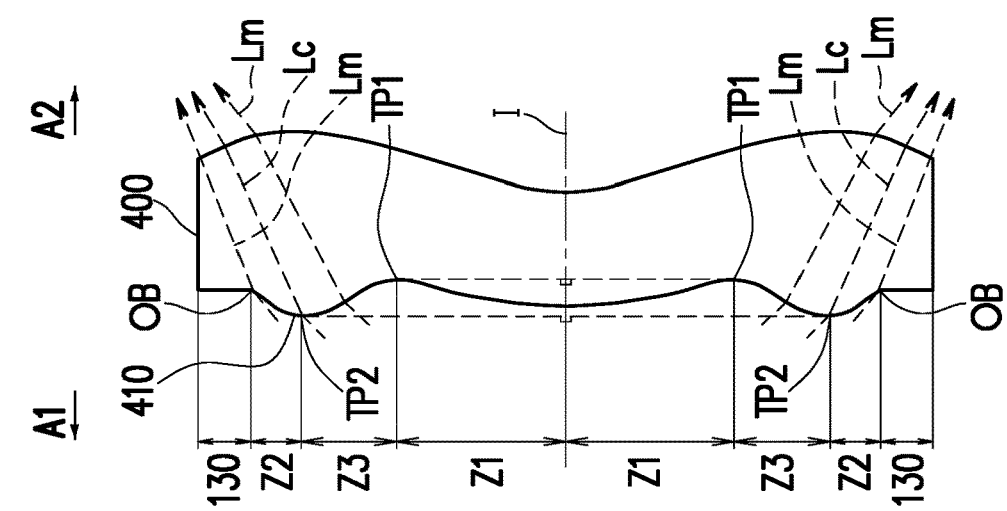
FIG. 5 is a schematic diagram illustrating a surface structure of a lens element according to Example 2.

FIG. 2 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 2, a first central point CP1 may be present on the first side surface 110 of lens element 100 and a second central point CP2 may be present on the second side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 5), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the second side A2 of the lens element. The shape of a region is concave if the extension line of a collimated ray being parallel to the optical axis I and passing through the region intersects the optical axis I on the first side A1 of the lens element.

Additionally, referring to FIG. 2, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 3:
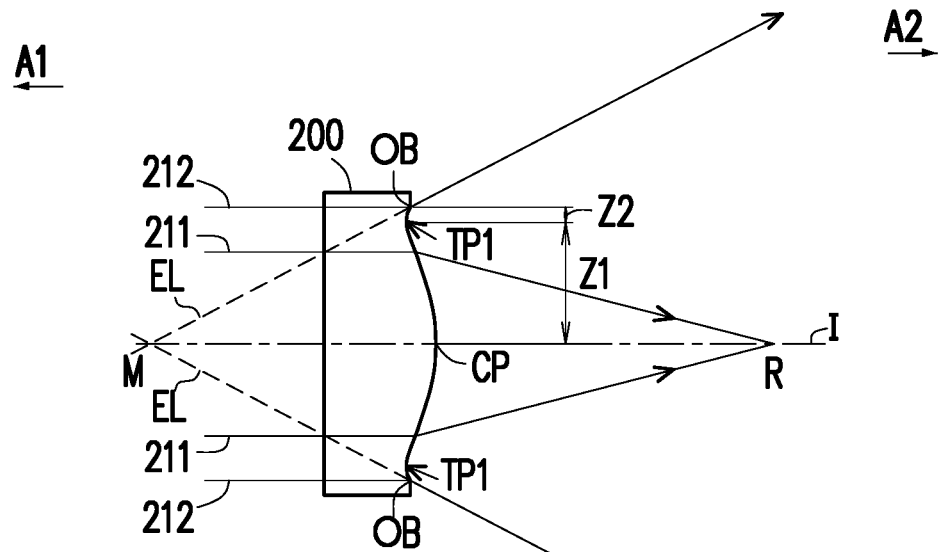
FIG. 3 is a schematic diagram illustrating a surface concave-convex structure of a lens element and a focal point of a ray.

Referring to FIG. 3, optical axis region Z1 is defined between central point CP and first transition point TP1. Periphery region Z2 is defined between TP1 and the optical boundary OB of the surface of the lens element. Collimated ray 211 intersects the optical axis I on the second side A2 of lens element 200 after passing through optical axis region Z1, i.e., the focal point of collimated ray 211 after passing through optical axis region Z1 is on the second side A2 of the lens element 200 at point R in FIG. 2. Accordingly, since the ray itself intersects the optical axis I on the second side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the first side A1 of lens element 200, i.e., the focal point of collimated ray 212 after passing through periphery region Z2 is on the first side A1 at point M in FIG. 2. Accordingly, since the extension line EL of the ray intersects the optical axis I on the first side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For a first side surface, a positive R value defines that the optical axis region of the first side surface is convex, and a negative R value defines that the optical axis region of the first side surface is concave. Conversely, for a second side surface, a positive R value defines that the optical axis region of the second side surface is concave, and a negative R value defines that the optical axis region of the second side surface is convex. The result found by using this method should be consistent with the method utilizing intersection of the optical axis by rays/extension lines mentioned above, which determines surface shape by referring to whether the focal point of a collimated ray being parallel to the optical axis I is on the first side or the second side of a lens element. As used herein, the terms "a shape of a region is convex (concave)," "a region is convex (concave)," and "a convex-(concave-) region," can be used alternatively.

Figure 6:
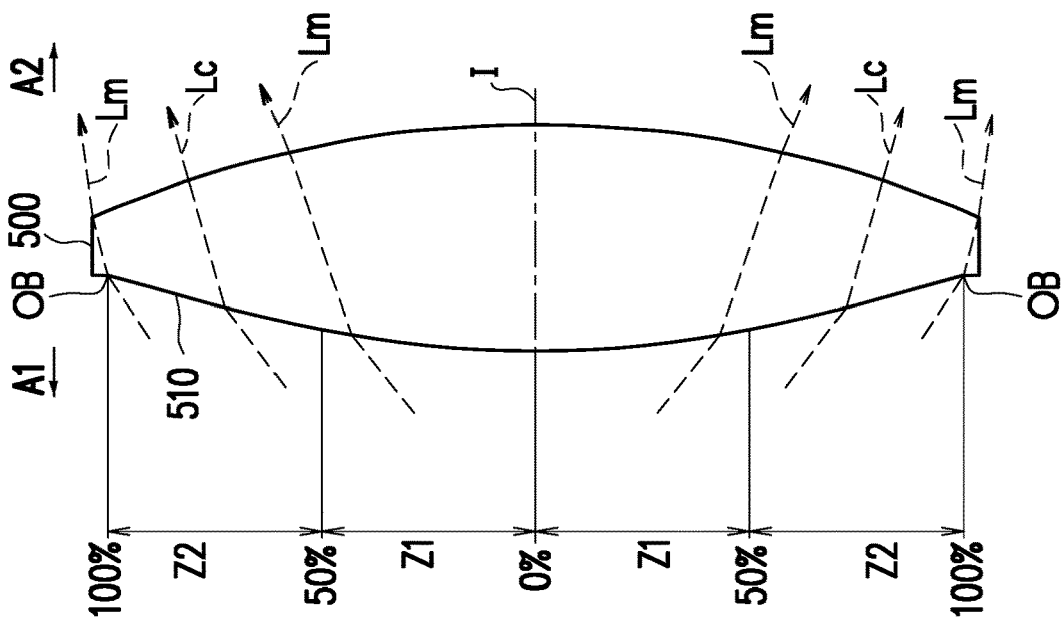
FIG. 6 is a schematic diagram illustrating a surface structure of a lens element according to Example 3.
Figure 4:
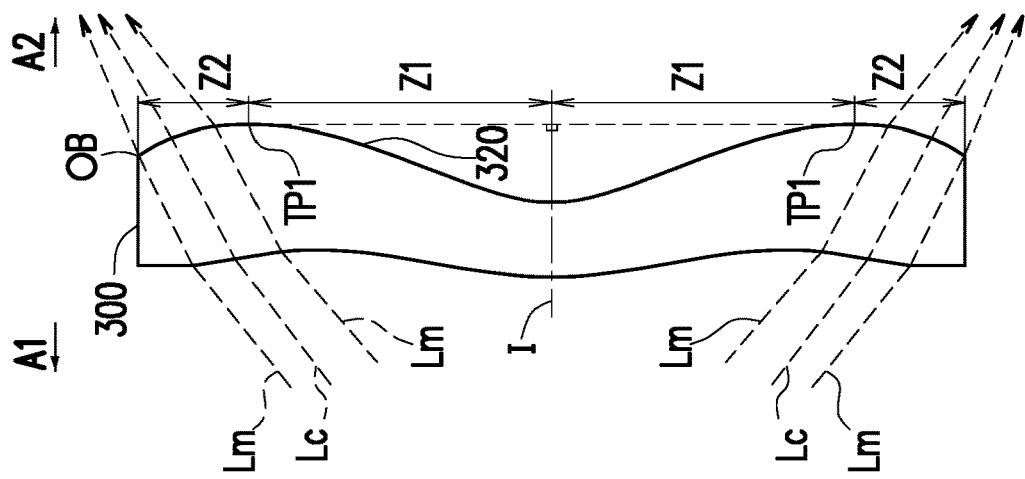
FIG. 4 is a schematic diagram illustrating a surface structure of a lens element according to Example 1.

FIG. 4, FIG. 5 and FIG. 6 illustrate examples of determining the shape of lens element regions and the boundaries of regions under various circumstances, including the optical axis region, the periphery region, and intermediate regions as set forth in the present specification.

FIG. 4 is a radial cross-sectional view of a lens element 300. As illustrated in FIG. 4, only one transition point TP1 appears within the optical boundary OB of the second side surface 320 of the lens element 300. Optical axis region Z1 and periphery region Z2 of the second side surface 320 of lens element 300 are illustrated. The R value of the second side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 4, since the shape of the optical axis region Z1 is concave, the shape of the periphery region Z2 will be convex as the shape changes at the transition point TP1.

FIG. 5 is a radial cross-sectional view of a lens element 400. Referring to FIG. 5, a first transition point TP1 and a second transition point TP2 are present on the first side surface 410 of lens element 400. The optical axis region Z1 of the first side surface 410 is defined between the optical axis I and the first transition point TP1. The R value of the first side surface 410 is positive (i.e., R>0). Accordingly, the optical axis region Z1 is convex.

The periphery region Z2 of the first side surface 410, which is also convex, is defined between the second transition point TP2 and the optical boundary OB of the first side surface 410 of the lens element 400. Further, intermediate region Z3 of the first side surface 410, which is concave, is defined between the first transition point TP1 and the second transition point TP2. Referring once again to FIG. 5, the first side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the first side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 6 is a radial cross-sectional view of a lens element 500. Lens element 500 has no transition point on the first side surface 510 of the lens element 500. For a surface of a lens element with no transition point, for example, the first side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 6, the optical axis region Z1 of the first side surface 510 is defined between the optical axis I and 50% of the distance between the optical axis I and the optical boundary OB. The R value of the first side surface 510 is positive (i.e., R>0). Accordingly, the optical axis region Z1 is convex. For the first side surface 510 of the lens element 500, because there is no transition point, the periphery region Z2 of the first side surface 510 is also convex. It should be noted that lens element 500 may have a mounting portion (not shown) extending radially outward from the periphery region Z2.

Figure 7:
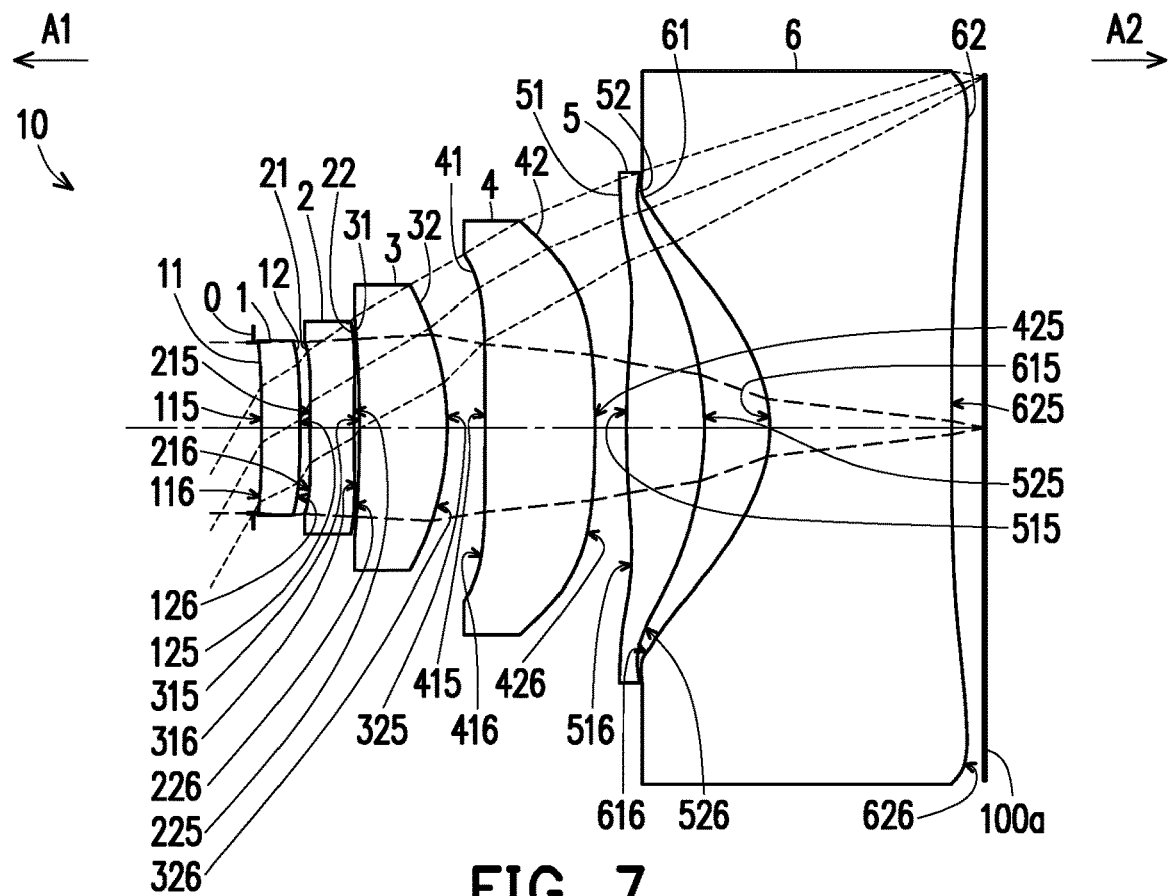
FIG. 7 is a schematic diagram of an optical lens assembly according to the first embodiment of the disclosure.

FIG. 7 is a schematic diagram of an optical lens assembly according to the first embodiment of the disclosure, and FIGS. 8A to 8D are diagrams of longitudinal spherical aberration and various aberrations of the optical lens assembly according to the first embodiment. Please refer to FIG. 7 first. The optical lens assembly 10 according to the first embodiment of the disclosure includes an aperture 0, a first lens element 1, a second lens element 2, a third lens element 3, a fourth lens element 4, a fifth lens element 5, and a sixth lens element 6 sequentially along an optical axis I of the optical lens assembly 10 from the first side A1 to the second side A2. When multiple imaging rays are emitted from the reference surface 100a (that is, the light-emitting surface of the multi-light generation unit PM) and enter the optical lens assembly 10, after passing through the sixth lens element 6, the fifth lens element 5, the fourth lens element 4, the third lens element 3, the second lens element 2, the first lens element 1, and the aperture 0, multiple imaging rays with different exit angles are generated on the first side A1 and are emitted from the optical lens assembly 10. It is added that, in the embodiment, the second side A2 is the side facing the multi-light generation unit PM, and the first side A1 is the opposite side. That is, the second side A2 is the light incident side, and the first side A1 is the light exit side.

The first lens element 1, the second lens element 2, the third lens element 3, the fourth lens element 4, the fifth lens element 5, and the sixth lens element 6 respectively have first side surfaces 11, 21, 31, 41, 51, and 61 facing the first side A1 and allowing the imaging rays to pass through, and second side surfaces 12, 22, 32, 42, 52, and 62 facing the second side A2 and allowing the imaging rays to pass through.

In the embodiment, the materials of the first lens element 1, the second lens element 2, the third lens element 3, the fourth lens element 4, the fifth lens element 5, and the sixth lens element 6 are respectively plastic, plastic, glass, plastic, plastic, and plastic, but the disclosure is not limited thereto.

The first lens element 1 has negative refracting power. An optical axis region 115 of the first side surface 11 of the first lens element 1 is concave, and a periphery region 116 thereof is concave. An optical axis region 125 of the second side surface 12 of the first lens element 1 is convex, and a periphery region 126 thereof is convex. In the embodiment, the first side surface 11 and the second side surface 12 of the first lens element 1 are both aspheric surfaces, but not limited thereto.

The second lens element 2 has positive refracting power. An optical axis region 215 of the first side surface 21 of the second lens element 2 is convex, and a periphery region 216 thereof is concave. An optical axis region 225 of the second side surface 22 of the second lens element 2 is concave, and a periphery region 226 thereof is also convex. In the embodiment, the first side surface 21 and the second side surface 22 of the second lens element 2 are both aspheric surfaces, but not limited thereto.

The third lens element 3 has positive refracting power. An optical axis region 315 of the first side surface 31 of the third lens element 3 is concave, and a periphery region 316 thereof is also concave. An optical axis region 325 of the second side surface 32 of the third lens element 3 is convex, and a periphery region 326 thereof is convex. In the embodiment, the first side surface 31 and the second side surface 32 of the third lens element 3 are both spherical surfaces, but not limited thereto.

The fourth lens element 4 has positive refracting power. An optical axis region 415 of the first side surface 41 of the fourth lens element 4 is concave, and a periphery region 416 thereof is also concave. An optical axis region 425 of the second side surface 42 of the fourth lens element 4 is convex, and a periphery region 426 thereof is convex. In the embodiment, the first side surface 41 and the second side surface 42 of the fourth lens element 4 are both aspheric surfaces, but not limited thereto.

The fifth lens element 5 has positive refracting power. An optical axis region 515 of the first side surface 51 of the fifth lens element 5 is convex, and a periphery region 516 thereof is concave. An optical axis region 525 of the second side surface 52 of the fifth lens element 5 is convex, and a periphery region 526 thereof is concave. In the embodiment, the first side surface 51 and the second side surface 52 of the fifth lens element 5 are both aspheric surfaces, but not limited thereto.

The sixth lens element 6 has negative refracting power. An optical axis region 615 of the first side surface 61 of the sixth lens element 6 is concave, and a periphery region 616 thereof is convex. An optical axis region 625 of the second side surface 62 of the sixth lens element 6 is concave, and a periphery region 626 thereof is convex. In the embodiment, the first side surface 61 and the second side surface 62 of the sixth lens element 6 are both aspheric surfaces, but not limited thereto.

The optical lens assembly 10 of the first embodiment has good thermal stability. Furthermore, at different environmental temperatures, the optical lens assembly 10 has very small focal shift. For example, a normal temperature of 20° C. is set as a reference. In an environment of 20° C., the focal shift of the optical lens assembly 10 is 0.000 mm. In an environment of −25° C., the focal shift of the optical lens assembly 10 is 0.019 mm. In an environment of 0° C., the focal shift of the optical lens assembly 10 is 0.008 mm. In an environment of 70° C., the focal shift of the optical lens assembly 10 is −0.020 mm.

Other detailed optical data of the first embodiment is as shown in FIG. 9, and the effective focal length (EFL) of the first embodiment is 5.026 mm, the half field of view (HFOV) is 60.000°, the system length (that is, TTL) is 8.444 mm, the aperture value (f-number, Fno) is 2.513, and the light circle radius (LCR) is 4.114 mm. The system length (that is, TTL) refers to the distance on the optical axis I from the first side surface 11 of the first lens element 1 to the reference surface 100a. When the optical lens assembly 10 is a projection lens of a projector, the "aperture value" in the present specification is the aperture value calculated based on the principle of light reversibility with the aperture 0 regarded as the incident pupil. When the optical lens assembly 10 is an imaging lens of a camera, the aperture value of the aperture 0 is the generally defined aperture value, that is, the aperture 0 is the incident pupil, and the aperture value is calculated according to the incident pupil.

In addition, in the embodiment, the first side surfaces 11, 21, 41, 51, 61 and the second side surfaces 12, 22, 42, 52, and 62 of the first lens element 1, the second lens element 2, the fourth lens element 4, the fifth lens element 5, and the sixth lens element 6 are all aspheric surfaces. The aspheric surfaces are defined by the following Equation (2):

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (2)$$

where,

Y: the distance between a point on an aspheric curve and the optical axis I;

Z: the depth of the aspheric surface (the vertical distance between a point on the aspheric surface with the distance Y from the optical axis I and the tangent to the vertex on the optical axis I of the aspheric surface);

R: the radius of curvature of the lens surface near the optical axis I;

K: conic constant; and $a_i$: the ith order aspheric coefficient.

The various aspheric coefficients of the first side surface 11 and the second side surface 12 of the first lens element 1, the first side surface 21 and the second side surface 22 of the second lens element 2, the first side surface 41 and the second side surface 42 of the fourth lens element 4, the first side surface 51 and the second side surface 52 of the fifth lens element 5, and the first side surface 61 and the second side surface 62 of the sixth lens element 6 in Equation (2) are as shown in FIG. 10. The field number 11 in FIG. 10 indicates the aspheric coefficient of the first side surface 11 of the first lens element 1, and other fields may be deduced by analogy.

In addition, important parameters and the relationship between important parameters in the optical lens assembly 10 of the first embodiment are as shown in FIGS. 27 and 28. Where, f1 is the focal length of the first lens element 1;
f2 is the focal length of the second lens element 2;
f3 is the focal length of the third lens element 3;
f4 is the focal length of the fourth lens element 4;
f5 is the focal length of the fifth lens element 5;
f6 is the focal length of the fifth lens element 6;
n1 is the refractive index of the first lens element 1;
n2 is the refractive index of the second lens element 2;
n3 is the refractive index of the third lens element 3;
n4 is the refractive index of the fourth lens element 4;
n5 is the refractive index of the fifth lens element 5;
n6 is the refractive index of the sixth lens element 6;
V1 is the Abbe number of the first lens element 1, and the Abbe number may also be referred to as the dispersion coefficient;
V2 is the Abbe number of the second lens element 2;
V3 is the Abbe number of the third lens element 3;
V4 is the Abbe number of the fourth lens element 4;
V5 is the Abbe number of the fifth lens element 5;
V6 is the Abbe number of the sixth lens element 6;
T1 is the thickness of the first lens element 1 on the optical axis I;
T2 is the thickness of the second lens element 2 on the optical axis I;
T3 is the thickness of the third lens element 3 on the optical axis I;
T4 is the thickness of the fourth lens element 4 on the optical axis I;
T5 is the thickness of the fifth lens element 5 on the optical axis I;
T6 is the thickness of the sixth lens element 6 on the optical axis I;
G12 is the air gap between the first lens element 1 and the second lens element 2 on the optical axis I;
G23 is the air gap between the second lens element 2 and the third lens element 3 on the optical axis I;
G34 is the air gap between the third lens element 3 and the fourth lens element 4 on the optical axis I;
G45 is the air gap between the fourth lens element 4 and the fifth lens element 5 on the optical axis I;
G56 is the air gap between the fifth lens element 5 and the sixth lens element 6 on the optical axis I;
AAG is the sum of the five air gaps from the first lens element 1 to the sixth lens element 6 on the optical axis I, that is, the sum of G12, G23, G34, G45, and G56;
ALT is the sum of the thicknesses of the six lens elements from the first lens element 1 to the sixth lens element 6 on the optical axis I, that is, the sum of T1, T2, T3, T4, T15, and T6;
EFL is the effective focal length of the optical lens assembly 10;
BFL is the distance on the optical axis I from the second side surface 62 of the sixth lens element 6 to the reference surface 100a, and the reference surface 100a is the light-emitting surface or the image plane;
TTL is the distance on the optical axis from the first side surface 11 of the first lens element 1 to the reference surface 100a, and the reference surface 100a is the light-emitting surface or the image plane;
TL is the distance on the optical axis I from the first side surface 11 of the first lens element 1 to the second side surface 62 of the sixth lens element 6;
HFOV is the half field of view of the optical lens assembly 10, and is the maximum half exit angle of the optical lens assembly 10 shown as co in FIG. 1A;
LCR (light circle radius) is the radius of the light-emitting circle (marked as LCR as shown in FIG. 1B), and is the radius of the smallest circumcircle of the light-emitting surface of the multi-light generation unit PM, or when the optical lens assembly 10 is configured for imaging, the value thereof may also be the image height (ImgH) of the optical lens assembly 10;

Fno is the aperture value calculated based on the principle of light reversibility and the effective aperture of the imaging ray emitted by the optical lens assembly 10, that is, the aperture value calculated with the aperture 0 regarded as the incident pupil in the embodiment of the disclosure.

In FIG. 27, the units of the values from the T1 column to the AAG column are all millimeters (mm).

Figures 8A, 8B, 8C, 8D:
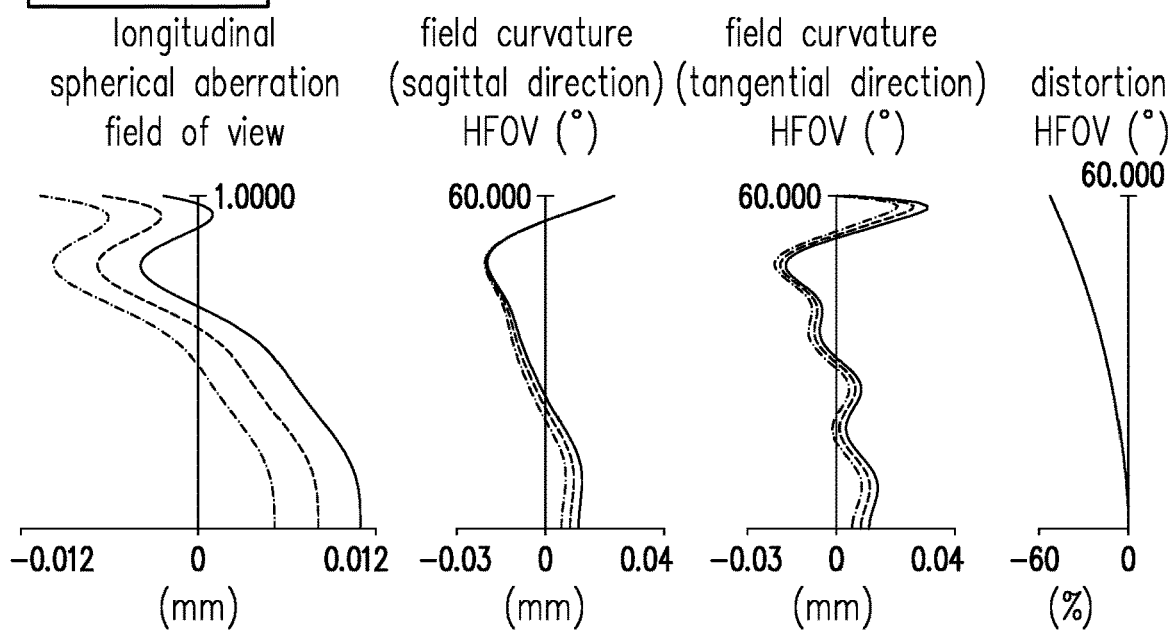
FIGS. 8A to 8D are diagrams of longitudinal spherical aberration and various aberrations of the optical lens assembly according to the first embodiment.

With reference to FIGS. 8A to 8D, the diagram of FIG. 8A illustrates the longitudinal spherical aberration on the reference surface 100a when the wavelengths are 520 nm, 530 nm, and 540 nm according to the first embodiment, the diagrams of FIGS. 8B and 8C respectively illustrate the field curvature aberration in the sagittal direction and the field curvature aberration in the tangential direction on the reference surface 100a when the wavelengths are 520 nm, 530 nm, and 540 nm according to the first embodiment, and the diagram of FIG. 8D illustrates the distortion aberration on the reference surface 100a when the wavelengths are 520 nm, 530 nm, and 540 nm according to the first embodiment. In the longitudinal spherical aberration diagram of FIG. 8A according to the first embodiment, the curves of each wavelength are very close and approach the middle, which illustrates that off-axis rays of each wavelength at different heights are concentrated near the imaging point. It can be seen from the skewness of the curves of each wavelength that the imaging point deviation of the off-axis rays at different heights is controlled in the range of ±0.012 mm. Therefore, the embodiment does significantly improve the spherical aberration of the same wavelength. In addition, the distances between the three representative wavelengths are also considerably close, which indicates that the imaging positions of rays with different wavelengths are already considerably concentrated, so that the chromatic aberration is also significantly improved.

In the field curvature aberration diagram of FIG. 8B, the focal length variation of the three representative wavelengths within the entire field of view falls within ±0.04 mm; and in the field curvature aberration diagram of FIG. 8C, the focal length variation of the three representative wavelengths within the entire field of view falls within ±0.04 mm, which illustrate that the optical system of the first embodiment can effectively eliminate aberration. The distortion aberration diagram of FIG. 8D shows that the distortion aberration of the first embodiment is maintained within the range of ±60%, which illustrates that the distortion aberration of the first embodiment complies with the optical quality requirements of the optical system. Accordingly, it is illustrated that compared with existing optical lens assemblies, the optical lens assembly of the first embodiment can still provide better optical quality under the condition that the system length has been shortened to 8.444 mm.

Figure 11:
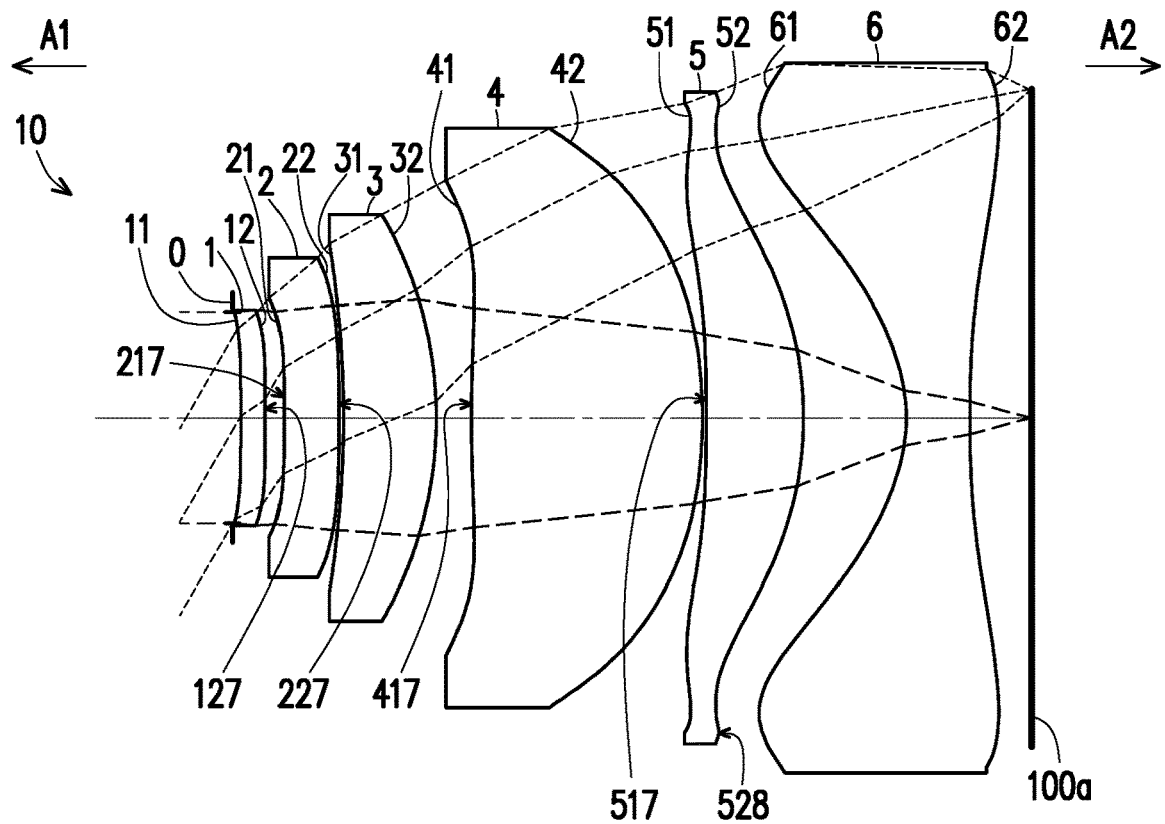
FIG. 11 is a schematic diagram of an optical lens assembly according to the second embodiment of the disclosure.

FIG. 11 is a schematic diagram of an optical lens assembly according to the second embodiment of the disclosure, and FIGS. 12A to 12D are diagrams of longitudinal spherical aberration and various aberrations of the optical lens assembly according to the second embodiment. Please refer to FIG. 11 first. The second embodiment of the optical lens assembly 10 of the disclosure is roughly similar to the first embodiment, except that the optical data, aspheric coefficients, and parameters between the lens elements 1, 2, 3, 4, 5, and 6 are more or less different. In addition, in the embodiment, the optical axis region 127 of the second side surface 12 of the first lens element 1 is concave, the optical axis region 217 of the first side surface 21 of the second lens element 2 is concave, the optical axis region 227 of the second side surface 22 of the second lens element 2 is convex, the optical axis region 417 of the first side surface 41 of the fourth lens element 4 is convex, the optical axis region 517 of the first side surface 51 of the fifth lens element 5 is concave, and the periphery region 528 of the second side surface 52 of the fifth lens element 5 is convex. Furthermore, in the embodiment, the materials of the second lens element 2 and the fourth lens element 4 are glass. It should be noted here that in order to clearly show the figure, the reference numerals of the optical axis region and the periphery region that are similar to the first embodiment are omitted in FIG. 11.

The optical lens assembly 10 of the second embodiment has good thermal stability. Furthermore, at different environmental temperatures, the optical lens assembly 10 has very small focal shift. For example, a normal temperature of 20° C. is set as a reference. In an environment of 20° C., the focal shift of the optical lens assembly 10 is 0.000 mm. In an environment of −25° C., the focal shift of the optical lens assembly 10 is −0.011 mm. In an environment of 0° C., the focal shift of the optical lens assembly 10 is −0.005 mm. In an environment of 70° C., the focal shift of the optical lens assembly 10 is 0.012 mm.

The detailed optical data of the optical lens assembly 10 is as shown in FIG. 13, and the EFL of the second embodiment is 3.897 mm, the HFOV is 60.000°, the system length (that is, TTL) is 7.464 mm, the aperture value (f-number, Fno) is 1.949, and the LCR is 3.111 mm.

The various aspheric coefficients of the first side surface 11 and the second side surface 12 of the first lens element 1, the first side surface 21 and the second side surface 22 of the second lens element 2, the first side surface 41 and the second side surface 42 of the fourth lens element 4, the first side surface 51 and the second side surface 52 of the fifth lens element 5, and the first side surface 61 and the second side surface 62 of the sixth lens element 6 in Equation (2) according to the second embodiment are as shown in FIG. 14.

In addition, important parameters and the relationship between important parameters in the optical lens assembly 10 of the second embodiment are as shown in FIGS. 27 and 28.

Figures 12A, 12B, 12C, 12D:
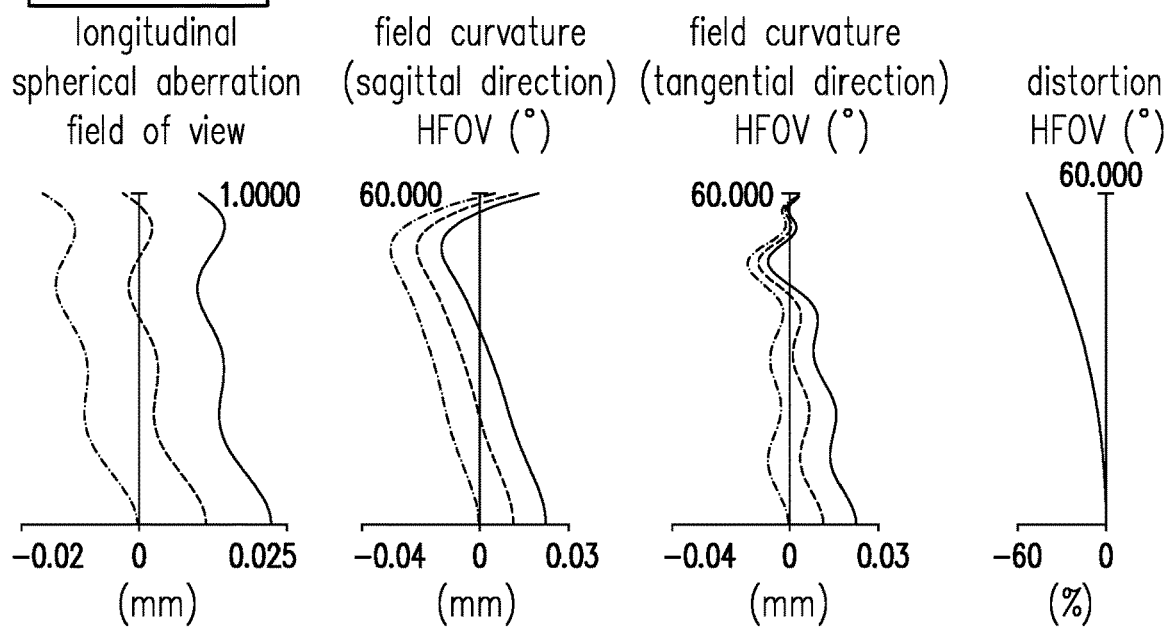
FIGS. 12A to 12D are diagrams of longitudinal spherical aberration and various aberrations of the optical lens assembly according to the second embodiment.

With reference to FIGS. 12A to 12D, the diagram of FIG. 12A illustrates the longitudinal spherical aberration on the reference surface 100a when the wavelengths are 520 nm, 530 nm, and 540 nm according to the second embodiment, the diagrams of FIGS. 12B and 12C respectively illustrate the field curvature aberration in the sagittal direction and the field curvature aberration in the tangential direction on the reference surface 100a when the wavelengths are 520 nm, 530 nm, and 540 nm according to the second embodiment, and the diagram of FIG. 12D illustrates the distortion aberration on the reference surface 100a when the wavelengths are 520 nm, 530 nm, and 540 nm according to the second embodiment. In the longitudinal spherical aberration diagram of FIG. 12A according to the second embodiment, the imaging point deviation of the off-axis rays at different heights is controlled in the range of ±0.025 mm. In the field curvature aberration diagram of FIG. 12B, the focal length variation of the three representative wavelengths within the entire field of view falls in the range of ±0.04 mm. In the field curvature aberration diagram of FIG. 12C, the focal length variation of the three representative wavelengths within the entire field of view falls in the range of ±0.04 mm. The distortion aberration diagram of FIG. 12D shows that the distortion aberration of the second embodiment is maintained in the range of ±60%. Accordingly, it is illustrated that compared with existing optical lens assemblies, the optical lens assembly of the second embodiment can still provide better optical quality under the condition that the system length has been shortened to 7.464 mm.

It can be known from the above descriptions that the advantages of the second embodiment compared to the first embodiment are: the system length (that is, TTL) of the second embodiment is shorter than the system length of the first embodiment.

FIG. 15 is a schematic diagram of an optical lens assembly according to the third embodiment of the disclosure, and FIGS. 16A to 16D are diagrams of longitudinal spherical aberration and various aberrations of the optical lens assembly according to the third embodiment. Please refer to FIG. 15 first. The third embodiment of the optical lens assembly 10 of the disclosure is roughly similar to the first embodiment, except that the optical data, aspheric coefficients, and parameters between the lens elements 1, 2, 3, 4, 5, and 6 are more or less different. In addition, in the embodiment, the optical axis region 517 of the first side surface 51 of the fifth lens element 5 is concave, and the periphery region 528 of the second side surface 52 of the fifth lens element 5 is convex. It should be noted here that in order to clearly show the figure, the reference numerals of the optical axis region and the periphery region that are similar to the first embodiment are omitted in FIG. 15.

The optical lens assembly 10 of the third embodiment has good thermal stability. Furthermore, at different environmental temperatures, the optical lens assembly 10 has very small focal shift. For example, a normal temperature of 20° C. is set as a reference. In an environment of 20° C., the focal shift of the optical lens assembly 10 is 0.000 mm. In an environment of −25° C., the focal shift of the optical lens assembly 10 is 0.003 mm. In an environment of 0° C., the focal shift of the optical lens assembly 10 is 0.001 mm. In an environment of 70° C., the focal shift of the optical lens assembly 10 is −0.003 mm.

The detailed optical data of the optical lens assembly 10 is as shown in FIG. 17, and the EFL of the third embodiment is 4.181 mm, the HFOV is 60.000°, the system length (that is, TTL) is 7.990 mm, the aperture value (f-number, Fno) is 2.090, and the LCR is 3.380 mm.

The various aspheric coefficients of the first side surface 11 and the second side surface 12 of the first lens element 1, the first side surface 21 and the second side surface 22 of the second lens element 2, the first side surface 41 and the second side surface 42 of the fourth lens element 4, the first side surface 51 and the second side surface 52 of the fifth lens element 5, and the first side surface 61 and the second side surface 62 of the sixth lens element 6 in Equation (2) according to the third embodiment are as shown in FIG. 18.

In addition, important parameters and the relationship between important parameters in the optical lens assembly 10 of the third embodiment are as shown in FIGS. 27 and 28.

With reference to FIGS. 16A to 16D, the diagram of FIG. 16A illustrates the longitudinal spherical aberration on the reference surface 100a when the wavelengths are 520 nm, 530 nm, and 540 nm according to the third embodiment, the diagrams of FIGS. 16B and 16C respectively illustrate the field curvature aberration in the sagittal direction and the field curvature aberration in the tangential direction on the reference surface 100a when the wavelengths are 520 nm, 530 nm, and 540 nm according to the third embodiment, and the diagram of FIG. 16D illustrates the distortion aberration on the reference surface 100a when the wavelengths are 520 nm, 530 nm, and 540 nm according to the third embodiment. In the longitudinal spherical aberration diagram of FIG. 16A according to the third embodiment, the imaging point deviation of the off-axis rays at different heights is controlled in the range of ±0.05 mm. In the field curvature aberration diagram of FIG. 16B, the focal length variation of the three representative wavelengths within the entire field of view falls in the range of ±0.06 mm. In the field curvature aberration diagram of FIG. 16C, the focal length variation of the three representative wavelengths within the entire field of view falls in the range of ±0.06 mm. The distortion aberration diagram of FIG. 16D shows that the distortion aberration of the third embodiment is maintained in the range of −60% to 0%. Accordingly, it is illustrated that compared with existing optical lens assemblies, the optical lens assembly of the third embodiment can still provide better optical quality under the condition that the system length has been shortened to 7.990 mm.

It can be known from the above descriptions that the advantages of the third embodiment compared to the first embodiment are: the system length of the third embodiment is shorter than the system length of the first embodiment; and the thickness difference between the optical axis region and the periphery region of the lens element in the third embodiment is smaller than that in the first embodiment, which is easy to be manufactured and has higher yield rate.

FIG. 19 is a schematic diagram of an optical lens assembly according to the fourth embodiment of the disclosure, and FIGS. 20A to 20D are diagrams of longitudinal spherical aberration and various aberrations of the optical lens assembly according to the fourth embodiment. Please refer to FIG. 19 first. The fourth embodiment of the optical lens assembly 10 of the disclosure is roughly similar to the first embodiment, except that the optical data, aspheric coefficients, and parameters between the lens elements 1, 2, 3, 4, 5, and 6 are more or less different. In addition, in the embodiment, the optical axis region 417 of the first side surface 41 of the fourth lens element 4 is convex, the optical axis region 427 of the second side surface 42 of the fourth lens element 4 is concave, the fifth lens element 5 has negative refracting power, the optical axis region 517 of the first side surface 51 of the fifth lens element 5 is concave, the periphery region 528 of the second side surface 52 of the fifth lens element 5 is convex, the sixth lens element 6 has positive refracting power, and the optical axis region 617 of the first side surface 61 of the sixth lens element 6 is convex. It should be noted here that in order to clearly show the figure, the reference numerals of the optical axis region and the periphery region that are similar to the first embodiment are omitted in FIG. 19.

The optical lens assembly 10 of the fourth embodiment has good thermal stability. Furthermore, at different environmental temperatures, the optical lens assembly 10 has very small focal shift. For example, a normal temperature of 20° C. is set as a reference. In an environment of 20° C., the focal shift of the optical lens assembly 10 is 0.000 mm. In an environment of −25° C., the focal shift of the optical lens assembly 10 is 0.015 mm. In an environment of 0° C., the focal shift of the optical lens assembly 10 is 0.007 mm. In an environment of 70° C., the focal shift of the optical lens assembly 10 is −0.017 mm.

The detailed optical data of the optical lens assembly 10 is as shown in FIG. 21, and the EFL of the fourth embodiment is 4.006 mm, the HFOV is 60.000°, the system length (that is, TTL) is 10.011 mm, the aperture value (f-number, Fno) is 2.003, and the LCR is 3.576 mm.

The various aspheric coefficients of the first side surface 11 and the second side surface 12 of the first lens element 1, the first side surface 21 and the second side surface 22 of the second lens element 2, the first side surface 41 and the second side surface 42 of the fourth lens element 4, the first side surface 51 and the second side surface 52 of the fifth lens element 5, and the first side surface 61 and the second side surface 62 of the sixth lens element 6 in Equation (2) according to the fourth embodiment are as shown in FIG. 22.

In addition, important parameters and the relationship between important parameters in the optical lens assembly 10 of the fourth embodiment are as shown in FIGS. 27 and 28.

With reference to FIGS. 20A to 20D, the diagram of FIG. 20A illustrates the longitudinal spherical aberration on the reference surface 100a when the wavelengths are 520 nm, 530 nm, and 540 nm according to the fourth embodiment, the diagrams of FIGS. 20B and 20C respectively illustrate the field curvature aberration in the sagittal direction and the field curvature aberration in the tangential direction on the reference surface 100a when the wavelengths are 520 nm, 530 nm, and 540 nm according to the fourth embodiment, and the diagram of FIG. 20D illustrates the distortion aberration on the reference surface 100a when the wavelengths are 520 nm, 530 nm, and 540 nm according to the fourth embodiment. In the longitudinal spherical aberration diagram of FIG. 20A according to the fourth embodiment, the imaging point deviation of the off-axis rays at different heights is controlled in the range of ±0.025 mm. In the field curvature aberration diagram of FIG. 20B, the focal length variation of the three representative wavelengths within the entire field of view falls in the range of ±0.08 mm. In the field curvature aberration diagram of FIG. 20C, the focal length variation of the three representative wavelengths within the entire field of view falls in the range of ±0.14 mm. The distortion aberration diagram of FIG. 20D shows that the distortion aberration of the fourth embodiment is maintained in the range of ±50%. Accordingly, it is illustrated that compared with existing optical lens assemblies, the optical lens assembly of the fourth embodiment can still provide better optical quality under the condition that the system length has been shortened to 10.011 mm.

It can be known from the above descriptions that the advantage of the fourth embodiment compared to the first embodiment are: the distortion aberration of the fourth embodiment is smaller than the distortion aberration of the first embodiment.

Figure 23:
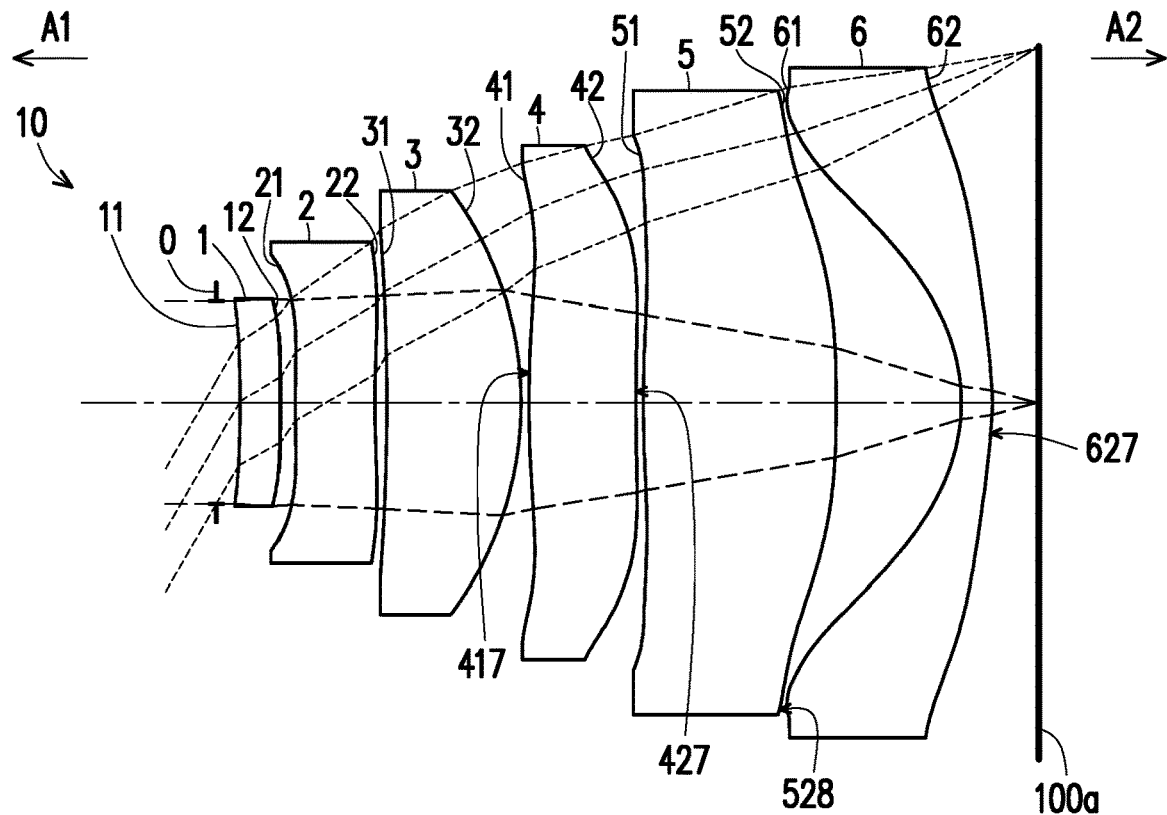
FIG. 23 is a schematic diagram of an optical lens assembly according to the fifth embodiment of the disclosure.

FIG. 23 is a schematic diagram of an optical lens assembly according to the fifth embodiment of the disclosure, and FIGS. 24A to 24D are diagrams of longitudinal spherical aberration and various aberrations of the optical lens assembly according to the fifth embodiment. Please refer to FIG. 23 first. The fifth embodiment of the optical lens assembly 10 of the disclosure is roughly similar to the first embodiment, except that the optical data, aspheric coefficients, and parameters between the lens elements 1, 2, 3, 4, 5, and 6 are more or less different. In addition, in the embodiment, the optical axis region 417 of the first side surface 41 of the fourth lens element 4 is convex, the optical axis region 427 of the second side surface 42 of the fourth lens element 4 is concave, the periphery region 528 of the second side surface 52 of the fifth lens element 5 is convex, the sixth lens element 6 has positive refracting power, and the optical axis region 627 of the second side surface 62 of the sixth lens element 6 is convex. It should be noted here that in order to clearly show the figure, the reference numerals of the optical axis region and the periphery region that are similar to the first embodiment are omitted in FIG. 23.

The optical lens assembly 10 of the fifth embodiment has good thermal stability. Furthermore, at different environmental temperatures, the optical lens assembly 10 has very small focal shift. For example, a normal temperature of 20° C. is set as a reference. In an environment of 20° C., the focal shift of the optical lens assembly 10 is 0.000 mm. In an environment of −25° C., the focal shift of the optical lens assembly 10 is 0.012 mm. In an environment of 0° C., the focal shift of the optical lens assembly 10 is 0.005 mm. In an environment of 70° C., the focal shift of the optical lens assembly 10 is −0.013 mm.

The detailed optical data of the optical lens assembly 10 is as shown in FIG. 25, and the EFL of the fifth embodiment is 3.696 mm, the HFOV is 60.000°, the system length (that is, TTL) is 7.875 mm, the aperture value (f-number, Fno) is 1.848, and the LCR is 3.521 mm.

The various aspheric coefficients of the first side surface 11 and the second side surface 12 of the first lens element 1, the first side surface 21 and the second side surface 22 of the second lens element 2, the first side surface 41 and the second side surface 42 of the fourth lens element 4, the first side surface 51 and the second side surface 52 of the fifth lens element 5, and the first side surface 61 and the second side surface 62 of the sixth lens element 6 in Equation (2) according to the fifth embodiment are as shown in FIG. 26.

In addition, important parameters and the relationship between important parameters in the optical lens assembly 10 of the fifth embodiment are as shown in FIGS. 27 and 28.

Figure 24A:
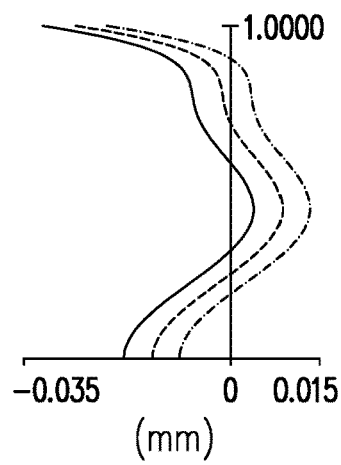
FIGS. 24A to 24D are diagrams of longitudinal spherical aberration and various aberrations of the optical lens assembly according to the fifth embodiment.
Figure 24B:
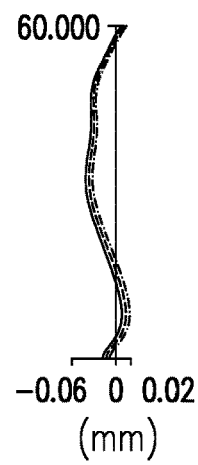
Figure 24C:
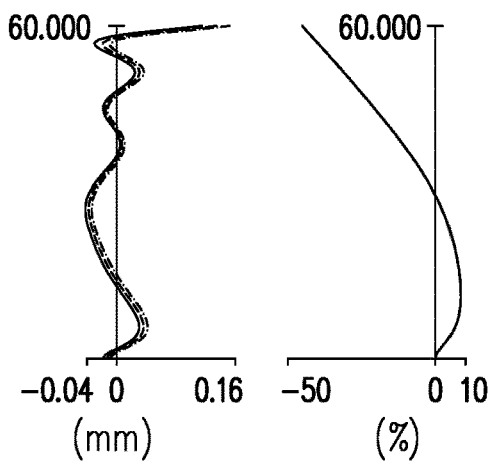
Figure 24D:
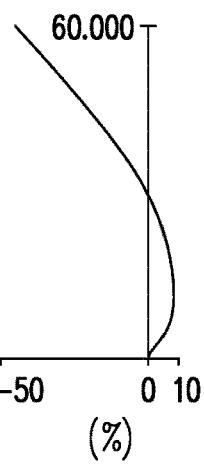

With reference to FIGS. 24A to 24D, the diagram of FIG. 24A illustrates the longitudinal spherical aberration on the reference surface 100a when the wavelengths are 520 nm, 530 nm, and 540 nm according to the fifth embodiment, the diagrams of FIGS. 24B and 24C respectively illustrate the field curvature aberration in the sagittal direction and the field curvature aberration in the tangential direction on the reference surface 100a when the wavelengths are 520 nm, 530 nm, and 540 nm according to the fifth embodiment, and the diagram of FIG. 24D illustrates the distortion aberration on the reference surface 100a when the wavelengths are 520 nm, 530 nm, and 540 nm according to the fifth embodiment. In the longitudinal spherical aberration diagram of FIG. 24A according to the fifth embodiment, the imaging point deviation of the off-axis rays at different heights is controlled in the range of ±0.035 mm. In the field curvature aberration diagram of FIG. 24B, the focal length variation of the three representative wavelengths within the entire field of view falls in the range of ±0.06 mm. In the field curvature aberration diagram of FIG. 24C, the focal length variation of the three representative wavelengths within the entire field of view falls in the range of ±0.16 mm. The distortion aberration diagram of FIG. 24D shows that the distortion aberration of the fifth embodiment is maintained in the range of −50% to 10%. Accordingly, it is illustrated that compared with existing optical lens assemblies, the optical lens assembly of the fifth embodiment can still provide better optical quality under the condition that the system length has been shortened to 7.875 mm.

It can be known from the above descriptions that the advantages of the fifth embodiment compared to the first embodiment are: the system length of the fifth embodiment is shorter than the system length of the first embodiment; and the distortion aberration of the fifth embodiment is smaller than the distortion aberration of the first embodiment.

With reference to FIGS. 27 and 28, which are tables of the various optical parameters of the five embodiments above, when the relational expressions between the various optical parameters in the optical lens assembly 10 according to the embodiments of the disclosure comply with at least one of the following conditional expressions, the designer is assisted to design an optical lens assembly with good optical performance and technical feasibility.

1. In order to improve the chromatic aberration of the entire optical lens assembly and achieve good thermal stability, there can be a better configuration if the values limited by the following conditional expressions are satisfied:

$V1+V2+V3 \le 110.000$, the preferred range is $72.000 \le V1+V2+V3 \le 110.000$;

$V3+V4+V5 \ge 130.000$, the preferred range is $130.000 \le V3+V4+V5 \le 175.000$.

2. In order to shorten the system length of the optical lens assembly 10, the air gap between the lens elements or the lens thickness may be adjusted appropriately, but the difficulty of production must be considered at the same time. Therefore, there can be a better configuration if the values limited by the following conditional expressions are satisfied:

$ALT/AAG \ge 3.300$, the preferred range is $3.300 \le ALT/AAG \le 4.500$;

$TL/BFL \ge 8.500$, the preferred range is $8.500 \le TL/BFL \le 23.000$;

$EFL/(T2+T4) \le 2.800$, the preferred range is $1.300 \le EFL/(T2+T4) \le 2.800$;

$TTL/(G12+G23+G34) \ge 13.500$, the preferred range is $13.500 \le TTL/(G12+G23+G34) \le 25.000$;

$(T2+T3+T4)/T1 \ge 6.400$, the preferred range is $6.400 \le (T2+T3+T4)/T1 \le 17.200$;

$ALT/(AAG+BFL) \ge 2.000$, the preferred range is $2.000 \le ALT/(AAG+BFL) \le 3.300$;

$TL/(T2+G23) \ge 8.200$, the preferred range is $8.200 \le TL/(T2+G23) \le 15.300$;

$(EFL+AAG)/(T3+T5) \le 3.500$, the preferred range is $1.500 \le (EFL+AAG)/(T3+T5) \le 3.500$;

$TTL/(T5+G56+T6) \le 3.000$, the preferred range is $2.000 \le TTL/(T5+G56+T6) \le 3.000$;

$(T5+T6)/T1 \ge 4.700$, the preferred range is $4.700 \le (T5+T6)/T1 \le 7.900$;

$ALT/(T3+T6) \le 3.600$, the preferred range is $1.500 \le ALT/(T3+T6) \le 3.600$;

$(TL+EFL)/(T3+G34) \le 8.900$, the preferred range is $4.600 \le (TL+EFL)/(T3+G34) \le 8.900$;

$AAG/(G45+G56) \le 1.700$, the preferred range is $1.100 \le AAG/(G45+G56) \le 1.700$;

$TTL/AAG \ge 4.800$, the preferred range is $4.800 \le TTL/AAG \le 6.100$;

$(T4+G45+T5)/(T1+G12) \ge 2.800$, the preferred range is $2.800 \le (T4+G45+T5)/(T1+G12) \le 8.500$.

In addition, any combination of the embodiment parameters may be selected to increase the limit of the optical lens assembly, so as to facilitate the design of the optical lens assembly with the same architecture of the disclosure. In view of the unpredictability of the optical system design, under the architecture of the disclosure, complying with the conditional expressions better enables the optical lens assembly of the disclosure to shorten the system length, increase the field of view, enhance the thermal stability, improve the optical quality, and/or increase the assembly yield rate, thereby improving the shortcomings of the prior art.

The exemplary limiting relational expressions may also be arbitrarily and selectively combined in varying amounts to be applied to the embodiments of the disclosure, and are not limited thereto. When implementing the disclosure, in addition to the relational expressions, other detailed structures such as the concave-convex curved surface arrangement of more lens elements may also be designed for a single lens element or more extensively for multiple lens elements to enhance the control of system performance and/or resolution. It should be noted that the details may be selectively combined to be applied to other embodiments of the disclosure without any conflict.

In addition, any combination of the embodiment parameters may be selected to increase the limit of the optical lens assembly, so as to facilitate the design of the optical lens assembly with the same architecture of the disclosure.

In view of the unpredictability of the optical system design, under the architecture of the disclosure, complying with the conditional expressions better enables the optical lens assembly of the disclosure to shorten the system length, increase the field of view, enhance the thermal stability, improve the optical quality, or increase the assembly yield rate.

The numerical range including the maximum and minimum values obtained from the combination ratio relationship of the optical parameters disclosed by each embodiment of the disclosure may be implemented accordingly.

In summary, the optical lens assembly according to the embodiments of the disclosure may achieve the following effects and advantages:

1. In the optical lens assembly according to the embodiments of the disclosure, by designing: the refracting power of the first lens element as negative, the periphery region of the second side surface of the second lens element as convex, the refracting power of the third lens element as positive, the periphery region of the first side surface of the third lens element as concave, and the refracting power of the fourth lens element as positive, aberrations are effectively improved and distortion is reduced, and the optical lens assembly allows light with different wavelengths to pass through while maintaining good optical quality and increases the field of view. Furthermore, if the design further satisfies $EFL/BFL \ge 3.800$, the size of the optical system can be reduced, and the preferred range of EFL/BFL is $3.800 \le EFL/BFL \le 14.300$.

2. In the optical lens assembly according to the embodiments of the disclosure, by designing: the refracting power of the second lens element as positive, the periphery region of the first side surface of the second lens element as concave, the periphery region of the first side surface of the sixth lens element as convex, and the refracting power of at least four lens elements of the first lens element to the sixth lens element as positive, if one of "(a) the periphery region of the second side surface of the third lens element is convex or (b) the periphery region of the second side surface of the sixth lens element is convex" is also satisfied, aberrations are effectively improved and distortion is reduced, and the optical lens assembly allows light with different wavelengths to pass through while maintaining good optical quality and increases the field of view. Furthermore, if the design further satisfies EFL/BFL≥3.800, the size of the optical system can be further reduced.

3. In the optical lens assembly according to the embodiments of the disclosure, by designing: the refracting power of the second lens element as positive, the periphery region of the first side surface of the second lens element as concave, the periphery region of the second side surface of the second lens element as convex, the refracting power of the third lens element as positive, the refracting power of the fourth lens element as positive, and the refracting power of the fifth lens element as positive, if one of "(a) the optical axis region of the second side surface of the first lens element is concave, (b) the periphery region of the second side surface of the third lens element is convex, or (c) the periphery region of the second side surface of the sixth lens element is convex" is also satisfied, aberrations are effectively improved and distortion is reduced, and the optical lens assembly has good thermal stability and allows light with different wavelengths to pass through while maintaining good optical quality.

4. Through appropriate material configuration, the material of at least one lens element is selected as glass to effectively improve the thermal stability and the assembly and production yield of lens element processing.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the scope of the appended claims.

What is claimed is:

1. An optical lens assembly, comprising a first lens element, a second lens element, a third lens element, a fourth lens element, a fifth lens element, and a sixth lens element sequentially along an optical axis from a first side to a second side, wherein the first side is a light exit side, the second side is a light incident side, and each of the first lens element to the sixth lens element comprises a first side surface facing the first side and allowing imaging rays to pass through, and a second side surface facing the second side and allowing imaging rays to pass through, wherein when any one of the first side surface and the second side surface has at least one transition point, at least one line tangent to the at least one transition point is perpendicular to the optical axis, a region located radially outside of a farthest transition point of the at least one transition point from the optical axis to an optical boundary of the any one of the first side surface and the second side surface is defined as a periphery region of the any one of the first side surface and the second side surface;

when the any one of the first side surface and the second side surface has no transition point, a periphery region of the any one of the first side surface and the second side surface is defined as a region between 50%-100% of a distance between the optical axis and the optical boundary of the any one of the first side surface and the second side surface;

the first lens element has negative refracting power;
the periphery region of the second side surface of the second lens element is convex;
the third lens element has positive refracting power, and the periphery region of the first side surface of the third lens element is concave;
the fourth lens element has positive refracting power; and
lens elements of the optical lens assembly only include the first lens element to the sixth lens element described above, and satisfy a following conditional expression: EFL/BFL≥3.800, where EFL is an effective focal length of the optical lens assembly, and BFL is a distance on the optical axis from the second side surface of the sixth lens element to a reference surface, wherein the reference surface is a light-emitting surface or an image plane.

2. The optical lens assembly according to claim 1, wherein the optical lens assembly further satisfies a following conditional expression: ALT/AAG≥3.300, where ALT is a sum of thicknesses of six lens elements from the first lens element to the sixth lens element on the optical axis, and AAG is a sum of five air gaps from the first lens element to the sixth lens element on the optical axis.

3. The optical lens assembly according to claim 1, wherein the optical lens assembly further satisfies a following conditional expression: TL/BFL≥8.500, where TL is a distance on the optical axis from the first side surface of the first lens element to the second side surface of the sixth lens element.

4. The optical lens assembly according to claim 1, wherein the optical lens assembly further satisfies a following conditional expression: EFL/(T2+T4)≤2.800, where T2 is a thickness of the second lens element on the optical axis, and T4 is a thickness of the fourth lens element on the optical axis.

5. The optical lens assembly according to claim 1, wherein the optical lens assembly further satisfies a following conditional expression: TTL/(G12+G23+G34)≥13.500, where TTL is a distance on the optical axis from the first side surface of the first lens element to the reference surface, G12 is an air gap between the first lens element and the second lens element on the optical axis, G23 is an air gap between the second lens element and the third lens element on the optical axis, and G34 is an air gap between the third lens element and the fourth lens element on the optical axis.

6. The optical lens assembly according to claim 1, wherein the optical lens assembly further satisfies a following conditional expression: (T2+T3+T4)/T1≥6.400, where T2 is a thickness of the second lens element on the optical axis, T3 is a thickness of the third lens element on the optical axis, T4 is a thickness of the fourth lens element on the optical axis, and T1 is a thickness of the first lens element on the optical axis.

7. The optical lens assembly according to claim 1, wherein the optical lens assembly further satisfies a following conditional expression: V1+V2+V3≤110.000, where V1 is an Abbe number of the first lens element, V2 is an Abbe number of the second lens element, and V3 is an Abbe number of the third lens element.

8. An optical lens assembly, comprising a first lens element, a second lens element, a third lens element, a fourth lens element, a fifth lens element, and a sixth lens element sequentially along an optical axis from a first side to a second side, wherein the first side is a light exit side, the second side is a light incident side, and each of the first lens element to the sixth lens element comprises a first side surface facing the first side and allowing imaging rays to pass through, and a second side surface facing the second side and allowing imaging rays to pass through, wherein when any one of the first side surface and the second side surface has at least one transition point, at least one line tangent to the at least one transition point is perpendicular to the optical axis, a region located radially outside of a farthest transition point of the at least one transition point from the optical axis to an optical boundary of the any one of the first side surface and the second side surface is defined as a periphery region of the any one of the first side surface and the second side surface;

when the any one of the first side surface and the second side surface has no transition point, a periphery region of the any one of the first side surface and the second side surface is defined as a region between 50%-100% of a distance between the optical axis and the optical boundary of the any one of the first side surface and the second side surface;

the second lens element has positive refracting power, and the periphery region of the first side surface of the second lens element is concave;

the periphery region of the second side surface of the third lens element is convex;

the periphery region of the first side surface of the sixth lens element is convex; and lens elements of the optical lens assembly only include the first lens element to the sixth lens element described above, at least four of the first lens element to the sixth lens element have positive refracting power, and the optical lens assembly satisfies a following conditional expression: EFL/BFL≥3.800, where EFL is an effective focal length of the optical lens assembly, and BFL is a distance on the optical axis from the second side surface of the sixth lens element to a reference surface, wherein the reference surface is a light-emitting surface or an image plane.

9. The optical lens assembly according to claim 8, wherein the optical lens assembly further satisfies a following conditional expression: ALT/(AAG+BFL)≥2.000, where ALT is a sum of thicknesses of six lens elements from the first lens element to the sixth lens element on the optical axis, and AAG is a sum of five air gaps from the first lens element to the sixth lens element on the optical axis.

10. The optical lens assembly according to claim 8, wherein the optical lens assembly further satisfies a following conditional expression: TL/(T2+G23)≥8.200, where TL is a distance on the optical axis from the first side surface of the first lens element to the second side surface of the sixth lens element, T2 is a thickness of the second lens element on the optical axis, and G23 is an air gap between the second lens element and the third lens element on the optical axis.

11. The optical lens assembly according to claim 8, wherein the optical lens assembly further satisfies a following conditional expression: (EFL+AAG)/(T3+T5)≤3.500, where AAG is a sum of five air gaps from the first lens element to the sixth lens element on the optical axis, T3 is a thickness of the third lens element on the optical axis, and T5 is a thickness of the fifth lens element on the optical axis.

12. The optical lens assembly according to claim 8, wherein the optical lens assembly further satisfies a following conditional expression: TTL/(T5+G56+T6)≤3.000, where TTL is a distance on the optical axis from the first side surface of the first lens element to the reference surface, T5 is a thickness of the fifth lens element on the optical axis, G56 is an air gap between the fifth lens element and the sixth lens element on the optical axis, and T6 is a thickness of the sixth lens element on the optical axis.

13. The optical lens assembly according to claim 8, wherein the optical lens assembly further satisfies a following conditional expression: (T5+T6)/T1≥4.700, where T5 is a thickness of the fifth lens element on the optical axis, T6 is a thickness of the sixth lens element on the optical axis, and T1 is a thickness of the first lens element on the optical axis.

14. The optical lens assembly according to claim 8, wherein the optical lens assembly further satisfies a following conditional expression: V3+V4+V5≥130.000, where V3 is an Abbe number of the third lens element, V4 is an Abbe number of the fourth lens element, and V5 is an Abbe number of the fifth lens element.

15. An optical lens assembly, comprising a first lens element, a second lens element, a third lens element, a fourth lens element, a fifth lens element, and a sixth lens element sequentially along an optical axis from a first side to a second side, wherein the first side is a light exit side, the second side is a light incident side, and each of the first lens element to the sixth lens element comprises a first side surface facing the first side and allowing imaging rays to pass through, and a second side surface facing the second side and allowing imaging rays to pass through, wherein when any one of the first side surface and the second side surface has at least one transition point, at least one line tangent to the at least one transition point is perpendicular to the optical axis, a region located radially outside of a farthest transition point of the at least one transition point from the optical axis to an optical boundary of the any one of the first side surface and the second side surface is defined as a periphery region of the any one of the first side surface and the second side surface;

when the any one of the first side surface and the second side surface has no transition point, a periphery region of the any one of the first side surface and the second side surface is defined as a region between 50%-100% of a distance between the optical axis and the optical boundary of the any one of the first side surface and the second side surface;

the second lens element has positive refracting power, and the periphery region of the first side surface of the second lens element is concave;

the periphery region of the first side surface of the sixth lens element is convex, and the periphery region of the second side surface of the sixth lens element is convex; and lens elements of the optical lens assembly only include the first lens element to the sixth lens element described above, at least four of the first lens element to the sixth lens element have positive refracting power, and the optical lens assembly satisfies a following conditional expression: EFL/BFL≥3.800, where EFL is an effective focal length of the optical lens assembly, and BFL is a distance on the optical axis from the second side surface of the sixth lens element to a reference surface, wherein the reference surface is a light-emitting surface or an image plane.

16. The optical lens assembly according to claim 15, wherein the optical lens assembly further satisfies a following conditional expression: ALT/(T3+T6)≤3.600, where ALT is a sum of thicknesses of six lens elements from the first lens element to the sixth lens element on the optical axis, T3 is a thickness of the third lens element on the optical axis, and T6 is a thickness of the sixth lens element on the optical axis.

17. The optical lens assembly according to claim 15, wherein the optical lens assembly further satisfies a following conditional expression: (TL+EFL)/(T3+G34)≤8.900, where TL is a distance on the optical axis from the first side surface of the first lens element to the second side surface of the sixth lens element, T3 is a thickness of the third lens element on the optical axis, and G34 is an air gap between the third lens element and the fourth lens element on the optical axis.

18. The optical lens assembly according to claim 15, wherein the optical lens assembly further satisfies a following conditional expression: AAG/(G45+G56)≤1.700, where AAG is a sum of five air gaps from the first lens element to the sixth lens element on the optical axis, G45 is an air gap between the fourth lens element and the fifth lens element on the optical axis, and G56 is an air gap between the fifth lens element and the sixth lens element on the optical axis.

19. The optical lens assembly according to claim 15, wherein the optical lens assembly further satisfies a following conditional expression: TTL/AAG≥4.800, where TTL is a distance on the optical axis from the first side surface of the first lens element to the reference surface, and AAG is a sum of five air gaps from the first lens element to the sixth lens element on the optical axis.

20. The optical lens assembly according to claim 15, wherein the optical lens assembly further satisfies a following conditional expression: (T4+G45+T5)/(T1+G12)≥2.800, where T4 is a thickness of the fourth lens element on the optical axis, G45 is an air gap between the fourth lens element and the fifth lens element on the optical axis, T5 is a thickness of the fifth lens element on the optical axis, T1 is a thickness of the first lens element on the optical axis, and G12 is an air gap between the first lens element and the second lens element on the optical axis.

* * * * *